United States Patent
Sterman et al.

(10) Patent No.: US 11,425,961 B2
(45) Date of Patent: *Aug. 30, 2022

(54) THREE-DIMENSIONAL PRINTING OF A TRACED ELEMENT

(71) Applicant: NIKE, Inc., Beaverton, OR (US)

(72) Inventors: Yoav Sterman, Portland, OR (US); Todd A. Waatti, Battle Ground, WA (US)

(73) Assignee: NIKE, Inc., Beaverton, OR (US)

( * ) Notice: Subject to any disclaimer, the term of this patent is extended or adjusted under 35 U.S.C. 154(b) by 174 days.

This patent is subject to a terminal disclaimer.

(21) Appl. No.: 16/595,291

(22) Filed: Oct. 7, 2019

(65) Prior Publication Data
US 2020/0046075 A1 Feb. 13, 2020

Related U.S. Application Data

(63) Continuation of application No. 15/409,341, filed on Jan. 18, 2017, now Pat. No. 10,455,896.
(Continued)

(51) Int. Cl.
| | |
|---|---|
| *A43B 23/02* | (2006.01) |
| *A43C 1/04* | (2006.01) |
| *A43B 7/08* | (2022.01) |
| *B29D 35/12* | (2010.01) |
| *B33Y 10/00* | (2015.01) |
| *B33Y 80/00* | (2015.01) |

(Continued)

(52) U.S. Cl.
CPC ............ *A43B 7/085* (2013.01); *A43B 23/026* (2013.01); *A43B 23/028* (2013.01); *A43B 23/0215* (2013.01); *A43B 23/0225* (2013.01); *A43B 23/0235* (2013.01); *A43B 23/0265* (2013.01); *A43C 1/04* (2013.01); *B29C 64/118* (2017.08); *B29D 35/126* (2013.01); *B33Y 10/00* (2014.12); *B33Y 80/00* (2014.12); *B29L 2031/50* (2013.01)

(58) Field of Classification Search
CPC .............. A43B 23/026; A43B 23/0225; A43B 23/0235; A43B 23/0265; A43B 7/085; A43C 1/04
See application file for complete search history.

(56) References Cited

U.S. PATENT DOCUMENTS

| | | |
|---|---|---|
| D164,847 S | 10/1951 | Dronoff |
| 5,121,329 A | 6/1992 | Crump |

(Continued)

FOREIGN PATENT DOCUMENTS

| | | |
|---|---|---|
| CN | 101267752 A | 9/2008 |
| CN | 102497792 A | 6/2012 |

(Continued)

OTHER PUBLICATIONS

International Search Report and Written Opinion, dated May 19, 2017, for corresponding International Patent Application No. PCT/US2017/013967 filed Jan. 18, 2017, 16 pages.

*Primary Examiner* — Ted Kavanaugh
(74) *Attorney, Agent, or Firm* — Klarquist Sparkman, LLP

(57) ABSTRACT

A method of forming a traced element is disclosed. The method may include printing layers of a traced element and incorporating a textile strand in overlapping polymer layers of the traced element. In some embodiments, the traced element may be formed on a base layer. The traced element may be incorporated into an upper for an article of footwear.

13 Claims, 14 Drawing Sheets

Related U.S. Application Data

(60) Provisional application No. 62/280,203, filed on Jan. 19, 2016.

(51) Int. Cl.
 *B29C 64/118* (2017.01)
 *B29L 31/50* (2006.01)

(56) References Cited

U.S. PATENT DOCUMENTS

| | | | |
|---|---|---|---|
| 5,322,860 A | 6/1994 | Ou | |
| 7,540,097 B2* | 6/2009 | Greene | A43B 9/00 |
| | | | 36/3 A |
| 8,123,350 B2 | 2/2012 | Cannell et al. | |
| 8,418,380 B2 | 4/2013 | Dojan et al. | |
| 8,789,295 B2 | 7/2014 | Burch et al. | |
| 8,819,963 B2 | 9/2014 | Dojan et al. | |
| 9,410,270 B2 | 8/2016 | Sterman et al. | |
| 10,455,896 B2* | 10/2019 | Sterman | A43B 23/0265 |
| 2007/0068040 A1* | 3/2007 | Farys | A43C 1/04 |
| | | | 36/50.1 |
| 2007/0180730 A1 | 8/2007 | Greene et al. | |
| 2010/0175276 A1 | 7/2010 | Dojan et al. | |
| 2010/0037483 A1 | 8/2010 | Meschter et al. | |
| 2012/0198727 A1* | 8/2012 | Long | A43C 1/00 |
| | | | 36/25 R |
| 2013/0015596 A1 | 1/2013 | Mozeika et al. | |
| 2013/0174446 A1 | 7/2013 | Antonelli et al. | |
| 2013/0219636 A1 | 8/2013 | Dojan et al. | |
| 2013/0219749 A1 | 8/2013 | Dojan et al. | |
| 2013/0340283 A1* | 12/2013 | Bell | A43B 23/025 |
| | | | 36/51 |
| 2014/0020191 A1 | 1/2014 | Jones et al. | |
| 2014/0020192 A1 | 1/2014 | Jones et al. | |
| 2014/0114457 A1 | 4/2014 | McDowell et al. | |
| 2014/0134378 A1 | 5/2014 | Downs et al. | |
| 2014/0150292 A1 | 6/2014 | Podhajny et al. | |
| 2014/0182170 A1 | 7/2014 | Wawrousek et al. | |
| 2014/0196310 A1 | 7/2014 | Beye et al. | |

FOREIGN PATENT DOCUMENTS

| | | |
|---|---|---|
| CN | 103476289 A | 12/2013 |
| CN | 104812555 A | 7/2015 |
| EP | 2189272 | 3/2012 |
| WO | WO 2014/100462 | 6/2014 |

* cited by examiner

THREE-DIMENSIONAL PRINTING OF A TRACED ELEMENT

CROSS REFERENCE TO RELATED APPLICATIONS

This application is a continuation of U.S. patent application Ser. No. 15/409,341, filed Jan. 18, 2017, which claims the benefit of U.S. Provisional Application No. 62/280,203, filed Jan. 19, 2016. The prior applications are incorporated herein by reference in their entirety.

BACKGROUND

The present embodiments relate generally to three-dimensional printing systems and methods.

Three-dimensional printing systems and methods may be associated with various technologies including fused deposition modeling (FDM), electron beam freeform fabrication (EBF), selective laser sintering (SLS) as well as other kinds of three-dimensional printing technologies.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
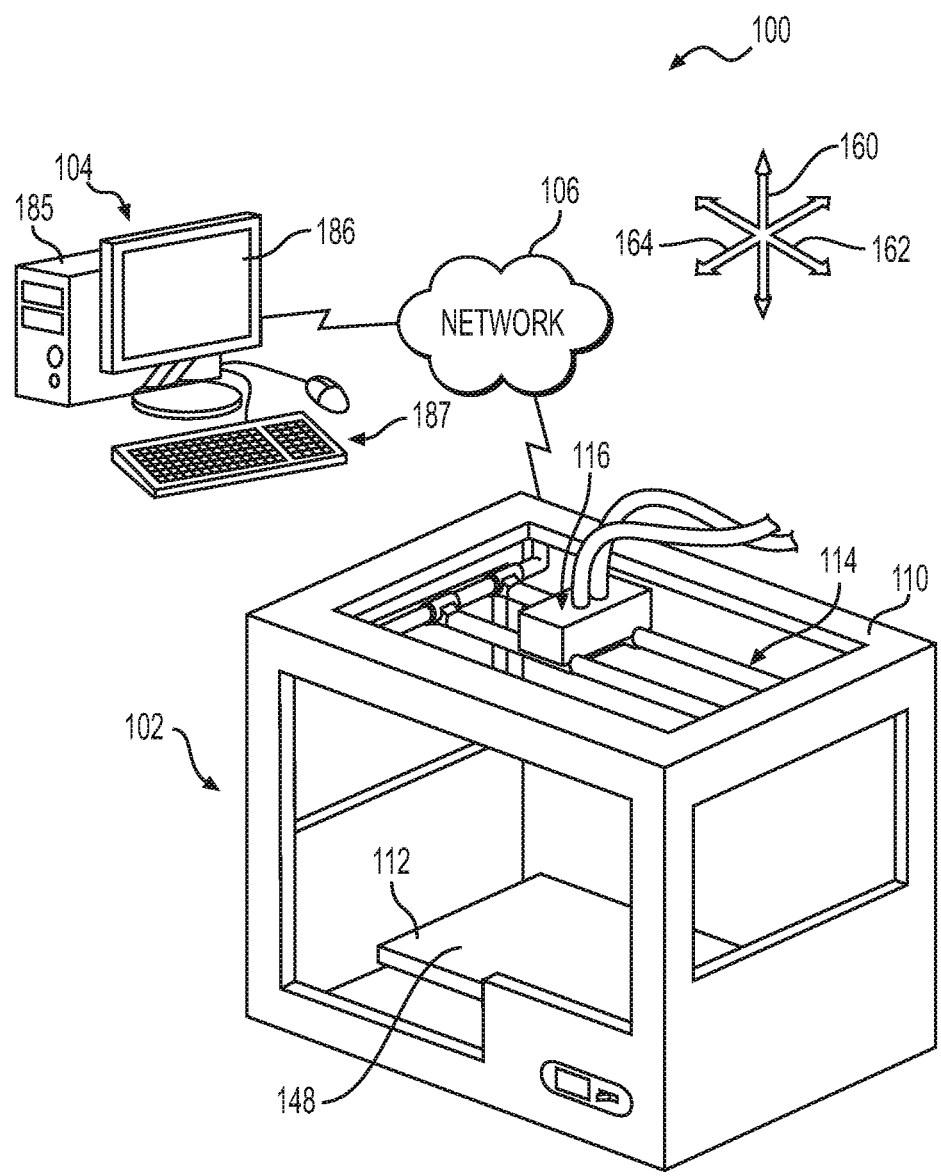
FIG. 1 is a schematic view of an embodiment of components of a three-dimensional printing system.

In one embodiment, the present disclosure is directed to an upper for an article of footwear comprising a traced element including a first polymer layer, a second polymer layer, and a strand layer. The first polymer layer defines a polymer-trace path, and the strand layer comprises a material strand disposed along a strand-trace path and over the first polymer layer. Furthermore, the second polymer layer is disposed along at least a portion of the polymer-trace path and overlaps both the first polymer layer and the strand layer for at least a portion of the polymer-trace path, and the traced element includes a plurality of openings surrounded by the first polymer layer, the strand layer, and the second polymer layer.

In another embodiment, the present disclosure is directed to an upper for an article of footwear having a traced element comprising a textile strand, a first portion of polymer material facing inward toward an interior of the upper, and a second portion of polymer material facing outward toward an exterior of the upper. The textile strand is disposed along and defines a strand-trace path having a plurality of curvilinear portions, and the first portion of polymer material and the second portion of polymer material are disposed along a first polymer-trace path and a second polymer-trace path, respectively, each having a plurality of curvilinear portions. In addition, an average width of the textile strand is at least 5 percent of an average width of the first portion of polymer material. The traced element extends over at least 50 percent of the horizontal extent of the upper (the horizontal extent being a distance between a foremost portion of the upper and a rearmost portion of the upper), and the traced element extends over at least 50 percent of a vertical extent of the upper (the vertical extent being a distance between a bottommost portion of the upper and a topmost portion of the upper.) Furthermore, the traced element includes a plurality of openings surrounded by one or more portions of the textile strand, the first portion of polymer material, and the second portion of polymer material.

In another embodiment, the present disclosure is directed to an article of footwear including an upper and a sole structure, the upper comprising a traced element including a textile strand, a first polymer layer, and a second polymer layer. The textile strand is disposed along a strand-trace path, the first polymer layer and the second polymer layer comprise a first polymer-trace path and a second polymer-trace path, respectively, and the traced element defines a plurality of openings surrounded by one or more textile strands, the first polymer layer, and the second polymer layer. Furthermore, the traced element extends over at least 50 percent of the horizontal extent of the upper, and the traced element extends over at least 50 percent of the vertical extent of the upper. In addition, the sole structure is secured to the upper and at least partially secured to the traced element and forms at least part of a ground-contacting surface of the article of footwear.

In another embodiment, the present disclosure is directed to a method of manufacturing an upper for an article of footwear; the method includes the steps of depositing a first layer of polymer material on a receiving layer and along a polymer-trace path, positioning a strand along a strand-trace path and over the first layer of polymer material, and depositing a second layer of polymer material along the polymer-trace path and over both the first layer of polymer material and the strand. In addition, the first layer of polymer material, the strand, and the second layer of polymer material surround a plurality of openings.

Other systems, methods, features, and advantages of the embodiments will be, or will become, apparent to one of ordinary skill in the art upon examination of the following figures and detailed description. It is intended that all such additional systems, methods, features, and advantages be included within this description and this summary, be within the scope of the embodiments, and be protected by the following claims.

FIG. 1 is a schematic view of an embodiment of a three-dimensional printing system 100, also referred to simply as printing system 100 hereafter. Printing system 100 may further comprise a printing device 102, a computing system 104, and a network 106. In different embodiments, structures may be formed using an additive manufacturing process, also referred to as three-dimensional printing (or simply "printing" hereafter). The term "additive manufacturing," also referred to as "three-dimensional printing," refers to any device and technology for making a three-dimensional object through an additive process where layers of material are successively laid down under the control of a computer. Exemplary additive manufacturing techniques that could be used include, but are not limited to, extrusion methods such as fused deposition modeling (FDM), electron beam freeform fabrication (EBF), direct metal laser sintering (DMLS), electron beam melting (EBM), selective laser melting (SLM), selective heat sintering (SHS), selective laser sintering (SLS), plaster-based 3D printing, laminated object manufacturing (LOM), stereolithography (SLA), and digital light processing (DLP). In one embodiment, an additive manufacturing device could be a fused deposition modeling type printer configured to print thermoplastic materials such as acrylonitrile butadiene styrene (ABS) or polyactic acid (PLA).

Additive manufacturing processes may be used to form structures on flat receiving surfaces as well as on contoured or non-flat surfaces. For example, some embodiments depicted in the figures may illustrate methods whereby material is printed onto a flattened surface of an article, such as a material section of an upper that has a flat or unassembled configuration. In such cases, printing material onto the surface may be accomplished by depositing material in thin layers that are also flat. Thus, a print head or nozzle may move in one or more horizontal directions to apply an Nth layer of material and then move in the vertical direction to begin forming the N+1 layer. However, it should be understood that in other embodiments material could be printed onto a contoured or non-flat surface. For example, material could be printed onto a three-dimensional last, where the surface of the last is not flat. In such cases, the printed layers applied to the surface may also be contoured. In order to accomplish this method of printing, a print head or nozzle may be configured to move along a contoured surface and tilt, rotate, or otherwise move so that the print head or nozzle is always aligned approximately normal to the surface where printed material is being applied. In some cases, a print head could be mounted to a robotic arm, such as an articulated robotic arm with six degrees of freedom. Alternatively, in still other embodiments, an object with a contoured surface could be reoriented under a nozzle so that contoured layers of printed material could be applied to the object. For example, embodiments could make use of any of the systems, features, components, and/or methods disclosed in Mozeika et al., U.S. Patent Publication Number 2013/0015596, published Jan. 17, 2013 (and filed as U.S. application Ser. No. 13/530,664 on Jun. 22, 2012), titled "Robotic fabricator," the entirety of which is herein incorporated by reference. Embodiments could also make use of any of the systems, features, components, and/or methods disclosed in Cannell et al., U.S. Pat. No. 8,123,350, issued Feb. 28, 2012, titled "Computerized apparatus and method for applying graphics to surfaces," the entirety of which is herein incorporated by reference. Thus, it may be appreciated that the present embodiments are not limited to printing processes used for printing to flat surfaces and may be used in conjunction with printing systems that can print to any kinds of surfaces having any kinds of geometry.

For consistency and convenience, directional adjectives are employed throughout this detailed description corresponding to the illustrated embodiments. The term "longitudinal," as used throughout this detailed description and in the claims, refers to a direction extending a length of a component. The term "longitudinal axis," as used throughout this detailed description and in the claims, refers to an axis oriented in a longitudinal direction.

The term "lateral direction," as used throughout this detailed description and in the claims, refers to a side-to-side direction extending a width of a component. For example, the lateral direction may extend between a medial side and a lateral side of an article of footwear, with the lateral side of the article of footwear being the surface that faces away from the other foot, and the medial side being the surface that faces toward the other foot. The term "lateral axis," as used throughout this detailed description and in the claims, refers to an axis oriented in a lateral direction.

The term "horizontal," as used throughout this detailed description and in the claims, refers to any direction substantially parallel with the longitudinal direction, the lateral direction, and all directions in between. In cases where a component is placed on the ground, a horizontal direction may be parallel with the ground.

The term "vertical," as used throughout this detailed description and in the claims, refers to a direction generally perpendicular to both the lateral and longitudinal directions, along a vertical axis. For example, in cases where a component is flat on a ground surface, the vertical direction may extend from the ground surface upward.

It will be understood that each of these directional adjectives may be applied to individual components of a sole. Furthermore, the term "outer surface" as used throughout this detailed description and in the claims, refers to the surface of a component that would be facing away from the foot when worn by a wearer. "Inner surface," or "inner side" as used throughout this detailed description and in the claims, refers to the surface of a component that is facing inward, or the surface that faces toward the foot when worn by a wearer.

For purposes of this disclosure, the foregoing directional terms, when used in reference to an article of footwear or another article of apparel, shall refer to the article of footwear when sitting in an upright position, with the sole facing groundward, that is, as it would be positioned when worn by a wearer standing on a substantially level surface.

In the embodiments shown in the figures, printing system 100 may be associated with fused filament fabrication (FFF), also referred to as fused deposition modeling. An example of a printing device using fused filament fabrication (FFF) is disclosed in Crump, U.S. Pat. No. 5,121,329, filed Oct. 30, 1989 and titled "Apparatus and Method for Creating Three-Dimensional Objects," which application is herein incorporated by reference and referred to hereafter as the "3D Objects" application. Embodiments of the present disclosure can make use of any of the systems, components, devices, and methods disclosed in the 3D Objects application.

Printing device 102 may include a housing 110 that supports various systems, devices, components or other provisions that facilitate the three-dimensional printing of objects (e.g., parts, components, or structures). Although the exemplary embodiment depicts a particular rectangular box-like geometry for housing 110, other embodiments could use any housing having any geometry and/or design. The shape and size of housing 110 could be varied according to factors including a desired footprint for the device, the size and shape of parts that may be formed within printing device 102, as well as possibly other factors. It will be understood that housing 110 could be open (e.g., provide a frame with large openings) or closed (e.g., with glass or panels of solid material and a door).

In some embodiments, printing device 102 may include provisions to retain or hold a printed object (or a component supporting the printed object). In some embodiments, printing device 102 may include a table, platform, tray or similar component to support, retain, and/or hold a printed object or an object onto which printed material is being applied. In the embodiment of FIG. 1, printing device 102 includes a tray 112. In some embodiments, tray 112 may be fixed in place and act as a stable base. In other embodiments, however, tray 112 could move. For example, in some cases, tray 112 may be configured to translate within housing 110 in a horizontal direction (e.g., front-back and/or left-right with respect to housing 110) as well as a vertical direction (e.g., up-down within housing 110). Moreover, in some cases, tray 112 may be configured to rotate and/or tilt about one or more axes associated with tray 112. Thus, it is contemplated that in at least some embodiments, tray 112 may be moved into any desired relative configuration with a nozzle or print head of printing device 102. In other embodiments, printing device 102 may not include tray 112. In some embodiments, tray 112 may be curved, irregularly shaped, or shaped to provide a customized platform upon which an article or object may be placed or secured. In some embodiments, printing device 102 may include an open space or cavity formed within tray 112.

In some embodiments, printing device 102 may include one or more systems, devices, assemblies, or components for delivering a printed material (or printed substance) to a target location. Target locations could include the surface of tray 112, and/or a surface or portion of a receiving layer, base layer, or other component. The target location or receiving layer may also be referred to as a print surface 148. In different embodiments, provisions for delivering printed materials include, for example, print heads and nozzles. In the embodiment of FIG. 1, printing device 102 includes a nozzle assembly 116.

In some embodiments, nozzle assembly 116 is associated with an actuating system 114. Actuating system 114 may include various components, devices, and systems that facilitate the motion of nozzle assembly 116 within housing 110. In particular, actuating system 114 may include provisions to move nozzle assembly 116 in any horizontal direction. Horizontal directions can include longitudinal directions, referred to herein as a third direction 164, and/or lateral directions, also referred to herein as a second direction 162, or any other direction lying along the horizontal plane. Actuating system 114 may also include provisions to move nozzle assembly 116 in any vertical direction, identified herein as a first direction 160. The movement of nozzle assembly 116 in various directions can facilitate the process of depositing a material so as to form a three-dimensional object or to print along a three-dimensional or curved surface. To this end, embodiments of actuating system 114 may include one or more tracks, rails, and/or similar provisions to hold nozzle assembly 116 at various positions and/or orientations within housing 110. Embodiments may also include any kinds of motors, such as a stepper motor or a servo motor, to move nozzle assembly 116 along a track or rail, and/or to move one or more tracks or rails relative to one another.

An actuating system can be configured to move a nozzle in one or more directions. In some embodiments, an actuating system could move a nozzle in a single linear direction. In other embodiments, an actuating system could move a nozzle in at least two perpendicular directions. In still other embodiments, an actuating system could move a nozzle in three perpendicular directions. For example, in the exemplary embodiment shown in FIG. 1, actuating system 114 may be configured to move nozzle 118 (see FIG. 2) in first direction 160, second direction 162, and third direction 164. As seen in FIG. 1, first direction 160 may be associated with a vertical direction of housing 110, while second direction 162 and third direction 164 may be associated with horizontal directions of housing 110 (e.g., length and width directions). Of course, while the exemplary embodiment depicts an actuating system capable of moving a nozzle through three independent x-y-z or Cartesian directions, other embodiments may be configured to move a nozzle in three independent directions associated with a non-Cartesian coordinate system (e.g., a spherical coordinate system, a cylindrical coordinate system, etc.). Still further, in other cases, an actuating system could move a nozzle through three different directions that may not be orthogonal (e.g., directions of an oblique coordinate system).

In certain embodiments, first direction 160 is approximately normal to a surface, such as a print surface 148. As used herein, a direction is approximately normal to a surface when it is within 10 degrees from perpendicular to the surface. For example, as shown, first direction 160 is approximately normal to print surface 148.

For purposes of this discussion, a print surface may correspond to the surface where a nozzle is printing. For example, in cases where nozzle 118 prints directly onto tray 112, the print surface is associated with a surface of tray 112. In the embodiment of FIG. 1, print surface 148 is illustrated as the side of tray 112 that faces upward toward nozzle assembly 116. However, it should be noted that in other embodiments, print surface 148 may comprise the surface or side of an article or object that is printed upon by nozzle 118. Print surface 148 may be generally flat, or it may be substantially curved and include contours.

In certain embodiments, printing system 100 can selectively move nozzle 118. In one embodiment, printing system 100 simultaneously moves nozzle 118 in three directions. For example, printing system 100 may move nozzle 118 in first direction 160 away from tray 112 while simultaneously moving nozzle 118 in second direction 162 and/or in third direction 164 over print surface 148. In another example, a position along a direction is maintained while printing system 100 selectively moves nozzle 118 in another direction. Printing system 100 may move nozzle 118 in first direction 160 to or away from print surface 148 while simultaneously maintaining a base position of nozzle 118 in second direction 162 and in third direction 164 over print surface 148.

In some embodiments, actuating system 114 can be operated manually by a user. In other embodiments, there may be provisions for automating the operation of actuating system 114. For example, some embodiments could include motors and/or other provisions for automatically driving nozzle 118 to various positions along one or more tracks. Moreover, in automated embodiments, the position or speed of nozzle 118 could be adjusted using controls provided in printing system 100, or using an associated system, such as computing system 104, which is discussed in further detail below.

It will be understood that for purposes of illustration, the components, devices, and systems of printing device 102 are shown schematically in FIG. 1. It will therefore be appreciated that embodiments may include additional provisions not shown, including specific parts, components, and devices that facilitate the operation of actuating system 114, and nozzle assembly 116. For example, actuating system 114 is shown schematically as including several tracks or rails, but the particular configuration and number of parts comprising actuating system 114 may vary from one embodiment to another.

As discussed above, printing system 100 can include provisions to control and/or receive information from printing device 102. These provisions can include a computing system 104 and a network 106. Generally, the term "computing system" refers to the computing resources of a single computer, a portion of the computing resources of a single computer, and/or two or more computers in communication with one another. Any of these resources can be operated by one or more human users. In some embodiments, computing system 104 may include one or more servers. In some cases, a print server may be primarily responsible for controlling and/or communicating with printing device 102, while a separate computer (e.g., desktop, laptop, or tablet) may facilitate interactions with a user. Computing system 104 can also include one or more storage devices including, but not limited to, magnetic, optical, magneto-optical, and/or memory, including volatile memory and non-volatile memory.

In the exemplary embodiment of FIG. 1, computing system 104 may comprise a central processing device 185, a viewing interface 186 (e.g., a monitor or screen), input devices 187 (e.g., keyboard and mouse), and software for designing a computer-aided design ("CAD") representation of a traced element (traced elements will be discussed further below). In at least some embodiments, the CAD representation of a traced element may include not only information about the geometry of the structure but also information related to the materials required to print various portions of the structure.

In some embodiments, computing system 104 may be in direct contact with printing device 102 via network 106. Network 106 may include any wired or wireless provisions that facilitate the exchange of information between computing system 104 and printing device 102. In some embodiments, network 106 may further include various components such as network interface controllers, repeaters, hubs, bridges, switches, routers, modems and firewalls. In some cases, network 106 may be a wireless network that facilitates wireless communication between two or more systems, devices, and/or components of printing system 100. Examples of wireless networks include, but are not limited to, wireless personal area networks (including, for example, Bluetooth), wireless local area networks (including networks utilizing the IEEE 802.11 WLAN standards), wireless mesh networks, mobile device networks as well as other kinds of wireless networks. In other cases, network 106 could be a wired network including networks whose signals are facilitated by twister pair wires, coaxial cables, and optical fibers. In still other cases, a combination of wired and wireless networks and/or connections could be used.

Printing system 100 may be operated as follows to provide one or more structures that have been formed using a 3D printing, or additive, process. Computing system 104 may be used to design a structure. This may be accomplished using some type of CAD software, or other kind of software. The design may then be transformed into information that can be interpreted by printing device 102 (or a related print server in communication with printing device 102). In some cases, the design may be converted to a 3D printable file, such as a stereolithography file (STL file).

Although some of the embodiments shown in the figures depict a system using fused filament fabrication printing technologies, it will be understood that still other embodiments could incorporate one or more different 3D printing technologies. For example, printing system 100 may use a tack and drag print method, as described in the Tack and Drag case. Moreover, still other embodiments could incorporate a combination of fused filament fabrication and another type of 3D printing technique to achieve desired results for a particular traced element or part.

In different embodiments, printing device 102 may use a variety of different materials for forming 3D parts, including, but not limited to, thermoplastics (e.g., polyactic acid and acrylonitrile butadiene styrene), high density polyethylene, eutectic metals, rubber, clays (including metal clays), Room Temperature Vulcanizing silicone (RTV silicone), porcelain, as well as possibly other kinds of materials known in the art. In embodiments where two or more different printed or extruded materials are used to form a part, any two or more of the materials disclosed above could be used. In some embodiments, printing device 102 may extrude, discharge, or use a material or thread composition as described in U.S. Pat. No. 9,410,270, issued Aug. 9, 2016, (previously U.S. patent application Ser. No. 14/466,319, filed Aug. 22, 2014), titled "Thread Structure Composition and Method of Making," the disclosure of which is hereby incorporated by reference in its entirety, and is hereinafter referred to as the "Thread Structure Composition" case.

Furthermore, additive printing systems used with the embodiments can make use of any printable material. The term "printed material" or "deposited material" is intended to encompass any materials that may be printed, ejected, emitted, or otherwise deposited during an additive manufacturing process. Such materials can include, but are not limited to, thermoplastics (e.g., PLA and ABS) and thermoplastic powders, high-density polyurethylene, eutectic metals, rubber, modeling clay, plasticine, RTV silicone, porcelain, metal clay, ceramic materials, plaster, and photopolymers, as well as possibly other materials known for use in 3D printing. In different embodiments, printed materials can also include polymers such as thermoplastic polymers as well as various types of strands, as will be discussed further below.

Furthermore, while the disclosed embodiments are described in the context of footwear, the disclosed embodiments may further be equally applied to any article of apparel or equipment that may be formed by 3D printing. Thus, as used throughout this disclosure, the term "article of apparel" may refer to any apparel or clothing, including any article of footwear, as well as hats, caps, shirts, jerseys, jackets, socks, shorts, pants, undergarments, athletic support garments, gloves, wrist/arm bands, sleeves, headbands, any knit material, any woven material, any nonwoven material, etc. Other examples of articles include, but are not limited to, shin guards, knee pads, elbow pads, shoulder pads, as well as any other type of protective equipment. Additionally, in some embodiments, the article could be another type of article that is not configured to be worn, including, but not limited to, balls, bags, purses, backpacks, as well as other articles that may not be worn.

In some embodiments, printing device 102 may be capable of printing onto the surfaces of various kinds of base layer materials. Specifically, in some cases, printing device 102 may be capable of printing onto the surfaces of various base layer materials such as textile, natural fabric, synthetic fabric, knit, woven material, nonwoven material, mesh, leather, synthetic leather, polymer, rubber, and foam, or any combination of them, without the need for a release layer interposed between a substrate and the bottom of the printed material, and without the need for a perfectly or near-perfectly flat substrate surface on which to print. For example, the disclosed methods may include printing a resin, acrylic, thermoplastic material or ink material onto a fabric, for example a knit material, where the material is adhered/bonded to the fabric and where the material does not generally delaminate when flexed, rolled, worked, or subject to additional assembly processes/steps. As used throughout this disclosure, the term "fabric" may be used to refer generally to materials chosen from any textile, natural fabric, synthetic fabric, knit, woven material, nonwoven material, mesh, leather, synthetic leather, polymers, rubbers, and foam. However, although some embodiments may use printing device 102 to print structures directly onto the surface of a material, other embodiments may include steps of printing a structure onto a tray or release paper, and then removing or releasing the traced element in a separate step.

Figure 2:
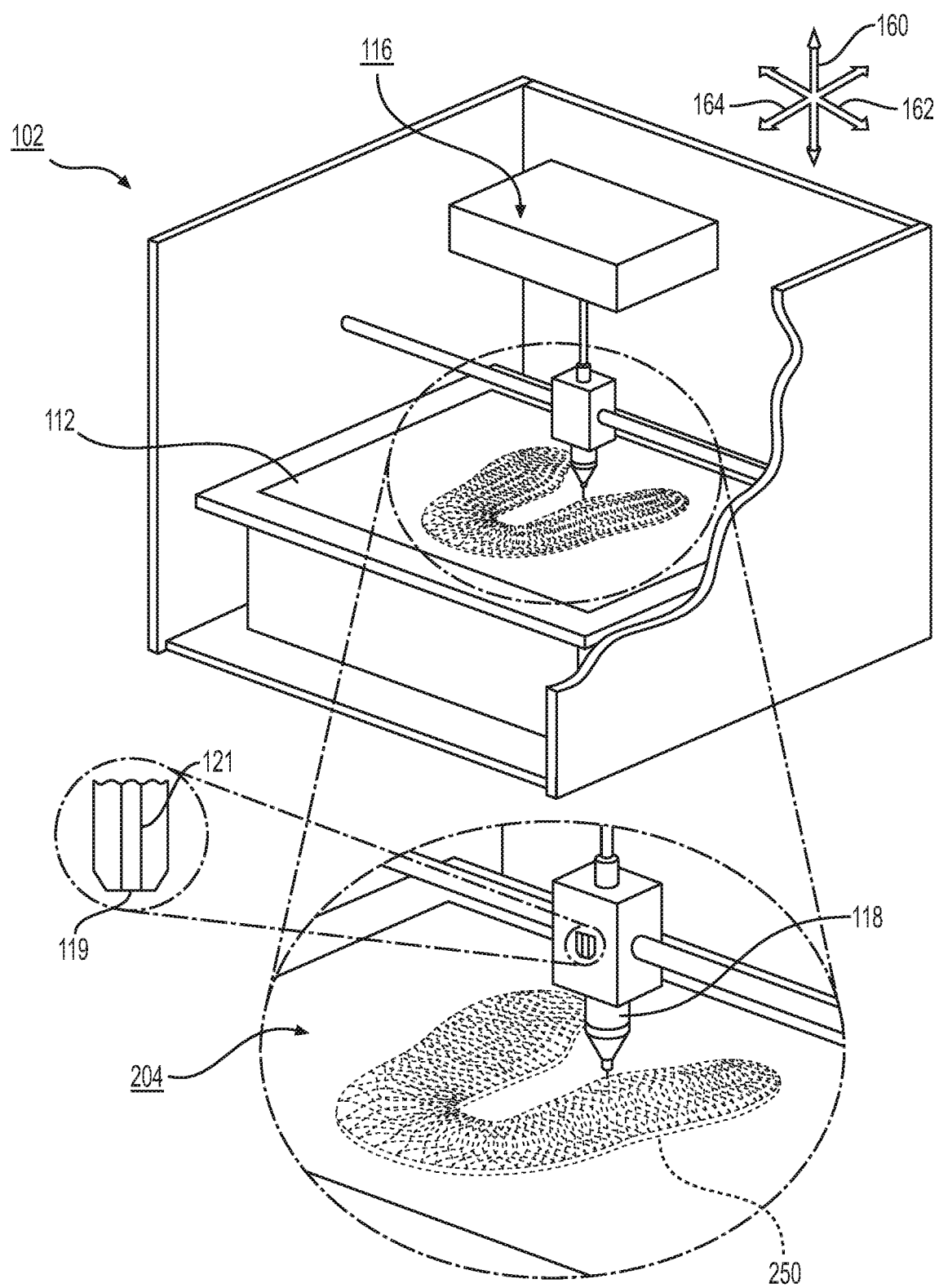
FIG. 2 is a schematic view of an embodiment of a printing device and a base with a traced element.

Referring now to FIG. 2, in some embodiments, printing device 102 may be configured to print one or more layered structures. For example, as shown in FIG. 2, a first layered structure ("first structure") 204 is depicted in the process of being formed by printing device 102. As seen in the magnified view provided in FIG. 2, first structure 204 comprises a portion of an unassembled upper for an article of footwear. A dotted lined outline 250 is intended to represent the contours of an example upper. In other embodiments, first structure 204 can comprise any type of component or structure for an article of footwear or apparel. In some embodiments, first structure 204 may be a heel counter or a shirt, for example. For purposes of this description, the surface of tray 112 or the layer upon which printing directly occurs will be referred to as print surface 148.

As will be described further below, in different embodiments, various layers may be printed during the formation of first structure 204. For example, a layered structure can be printed or deposited directly upon tray 112. In addition, a textile strand can be deposited directly on a first layer of first structure 204. The process will now be described in more detail with reference to FIGS. 3-10.

Nozzle assembly 116 may comprise one or more nozzles that deliver a printed material to a target location. For purposes of clarity, the embodiment of FIGS. 2-11 depicts a single nozzle 118 of nozzle assembly 116. However, in other embodiments, nozzle assembly 116 could be configured with any number of nozzles, which could be arranged in an array or any particular configuration. In embodiments comprising two or more nozzles, the nozzles could be configured to move together and/or independently.

In addition, as shown in FIG. 2, nozzle 118 may be configured with a nozzle aperture 119 that can be opened and/or closed to control the flow of material exiting from nozzle 118. Specifically, nozzle aperture 119 may be in fluid communication with a nozzle channel 121 that receives a supply of material from a material source (not shown) within printing device 102. Some examples of materials that may be received or used or methods of three-dimensional printing that can be utilized with the embodiments discussed herein are disclosed in not-yet-published U.S. patent application Ser. No. 14/935,731, filed Nov. 9, 2015), titled "Tack and Drag Printing," which application is herein incorporated by reference in its entirety, and hereinafter referred to as the "Tack and Drag" case.

In some embodiments, a worm-drive may be used to push the filament into nozzle 118 at a specific rate (which may be varied to achieve a desired volumetric flow rate of material from nozzle 118). In other embodiments, a worm-drive is omitted. For example, the material may be pulled from nozzle 118 using an actuating system. It will be understood that in some cases, the supply of material could be provided at a location near nozzle 118 (e.g., in a portion of nozzle assembly 116), while in other embodiments the supply of material could be located at some other location of printing device 102 and fed via tubes, conduits, or other provisions, to nozzle assembly 116.

Figure 3:
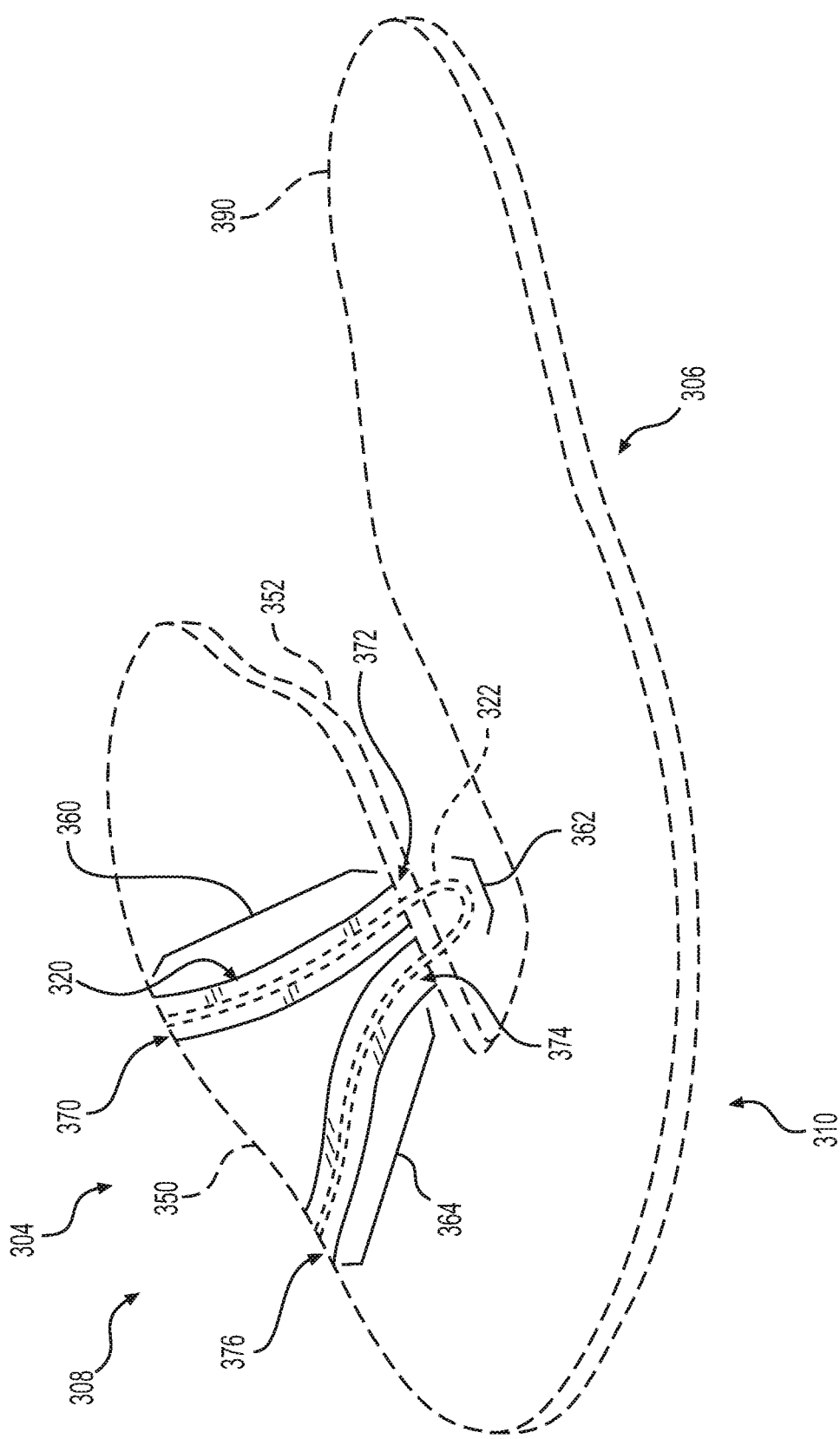
FIG. 3 is an isometric view of a portion of a traced element.

Referring now to FIG. 3, a schematic view of a portion of an upper 390 (shown in dotted lines) with a second structure 304 is illustrated. Second structure 304 comprises a polymer casing 320 (comprising at least a first layer of polymer and a second layer of polymer) surrounding a substantial majority of a textile strand 322. In different embodiments, an upper as described herein may include multiple layers, which may individually or collectively provide an article of footwear with a number of attributes, such as support, flexibility, stability, cushioning, comfort, reduced weight, or other attributes. In some embodiments, the layered structure may comprise a traced element, as will be discussed below. Thus, in some embodiments, an upper may be a layered structure. For purposes of this disclosure, a layer refers to a segment or portion of the upper that extends along a horizontal direction or is disposed within a substantially similar level of the upper. In one embodiment, the layer can be likened to a stratum in the earth, for example. In other words, a layer can be a horizontally arranged section of the upper that can be disposed above, between, or below other adjacent layers of materials. Each layer can incorporate one or more portions of increased or decreased tensile strength, elasticity, or thickness relative to other layers in the upper. In some embodiments, a layer may comprise various composite materials that enhance structural support. In other embodiments, a layer may comprise materials configured to distribute forces applied along the upper. Generally, the uppers of the disclosed embodiments may comprise any number of layers. In some cases, an upper can comprise two or more layers. In other cases, an upper can comprise two layers that encase a textile strand, as shown in FIG. 3. In some cases, however, one or more of these components or layers may be omitted.

In different embodiments, each layer may provide different features, properties, responses, and/or characteristics to an upper. The following figures represent several possible embodiments of the disclosure for purposes of illustration. However, it should be understood that other embodiments may include variations to one or more layers that differ from those illustrated with reference to FIGS. 1-17. Thus, other embodiments can include different types of uppers with properties resulting from the combination of a variety of different types of layers.

As noted above, in the example of FIG. 3, second structure 304 is depicted as including only a portion of an upper associated with a medial side 308 of upper 390 for purposes of clarity, while the remainder of upper 390 (including a lateral side 306) is not depicted. For purposes of reference, it can be seen that second structure 304 includes a first segment 360, a second segment 362, and a third segment 364. First segment 360 includes a first polymer layer and a second polymer layer comprising polymer casing 320, and a dotted line representation of textile strand 322 "sandwiched" between the two layers of polymer casing 320. In addition, first segment 360 extends from a first end 370 along an outer peripheral edge 350 to a second end 372 along an inner peripheral edge 352. Extending between second end 372 and a third end 374 is second segment 362. Third end 374 is formed along inner peripheral edge 352, spaced apart from second end 372 and nearer to a forefoot region 310 relative to second end 372. Second segment 362 will be discussed further below. In addition, extending from third end 374 to a fourth end 376 is third segment 364, where fourth end 376 is formed along outer peripheral edge 350, spaced apart from first end 370 and nearer to forefoot region 310 relative to first end 370. Third segment 364 also includes a first polymer layer and a second polymer layer comprising polymer casing 320, and a dotted line representation of textile strand 322 "sandwiched" between the two layers of polymer casing 320.

In contrast to first segment 360 and third segment 364, second segment 362 comprises only an exposed portion of textile strand 322. In other words, while each of first segment 360 and third segment 364 of textile strand 322 is enclosed between polymer casing 320, second segment 362 comprising textile strand 322 is uncovered or "exposed." Thus, in some embodiments, second structure 304 may include portions that comprise fewer than two layers (or no layers).

In order to provide greater clarity to the reader, a sequence illustrating a process that may be utilized during the formation of a traced element described herein is shown in FIGS. 4-10. As will be described in greater detail below, for purposes of this disclosure, a traced element refers to a printed structure in which two or more distinct layers have print paths with overlapping or aligned printed portions.

Figure 4:
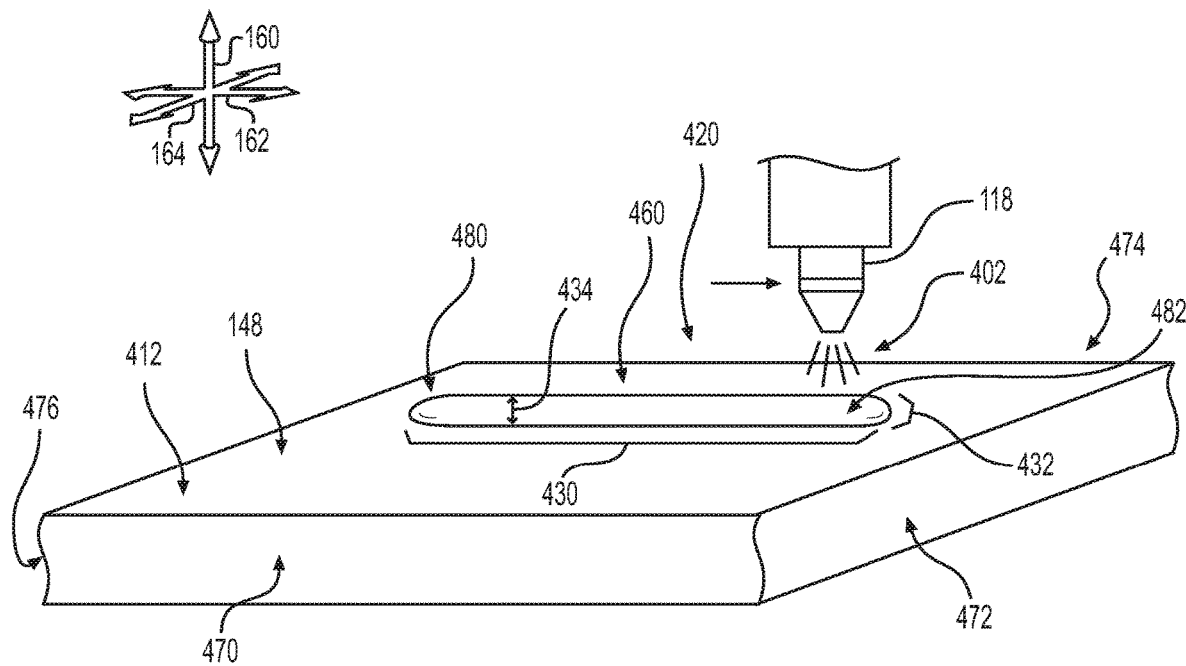
FIG. 4 is a schematic view of an embodiment of a portion of a printing device during operation with a first layer of material.

In FIGS. 4-10, nozzle 118 is disposed above a portion of a platform ("platform") 412 during the printing process. In some embodiments, platform 412 may be substantially similar to tray 112 of FIG. 1. For purposes of reference, platform 412 depicted has a first side 470, a second side 472, a third side 474, and a fourth side 476. Referring to FIG. 4, nozzle 118 has begun to deposit a first layer 420 on print surface 148 (here the upper surface of platform 412). A first elongated portion 460 of first layer 420 has been formed near third side 474 of platform 412. The direction of movement of nozzle 118 is indicated schematically by an arrow drawn adjacent to nozzle 118. In FIG. 4, the direction of movement is substantially aligned with second direction 162.

As previously mentioned, nozzle 118 is configured to emit, discharge, or extrude various materials. In some embodiments, printed material(s) may be discharged, ejected, or otherwise emitted via nozzle 118 in the form of droplets 402. One of ordinary skill in the art will recognize that the form of droplets 402 may vary depending on the actual material ejected or otherwise emitted from nozzle 118. In some embodiments, droplets 402 may thus be any viscosity liquid material, or even a semi-solid material. In some embodiments, droplets 402 may be any desired material or phase of material suitable for use in the printing system. In some embodiments, the nozzle system employed may be equivalent or identical to that used in inkjet printing systems, such as piezo inkjet systems. Thus, in some other embodiments, a nozzle may be associated with a piezoelectric inkjet head. In FIG. 4, nozzle 118 is emitting droplets 402 that include a polymer material. Furthermore, in the embodiments of FIGS. 4 and 5, first layer 420 (e.g., a polymer layer) is deposited through the use of an FDM method. However, in other embodiments, nozzle 118 may extrude other materials or other additive manufacturing processes may be utilized. For example, as will be discussed below with respect to FIGS. 6-8, nozzle 118 may extrude a continuous thread or discrete thread segments. Such a thread may include a composition as described in the Thread Structure Composition and Method of Making application.

In the embodiment of FIG. 4, first elongated portion 460 extends from a first lower layer end 480 near fourth side 476 to a second lower layer end 482 near second side 472. Droplets 402 may be deposited over one or more runs as nozzle 118 moves over platform 412. In some cases, nozzle 118 may remain stationary over a particular location of platform 412 in order to increase the amount of droplets 402 deposited in the location. Thus, the thickness of first layer 420 may be adjusted based on the density or amount of droplets 402 deposited in one location in some embodiments.

In addition, first elongated portion 460 has a first length 430 (where the length is associated with the distance aligned with second direction 162), a first width 432 (where the width is associated with the distance aligned with third direction 164), and a first thickness 434 (where the thickness is associated with the distance aligned with first direction 160). In different embodiments, first elongated portion 460 may vary in size, shape, and thickness. For example, in other embodiments, first elongated portion 460 may be smaller or greater in length, width, or thickness than shown here. Furthermore, in FIG. 4, first elongated portion 460 has a width and a thickness that are each substantially constant. However, it should be understood that in other embodiments, the width and/or thickness of a portion of first layer 420 may vary across the portion.

Figure 5:
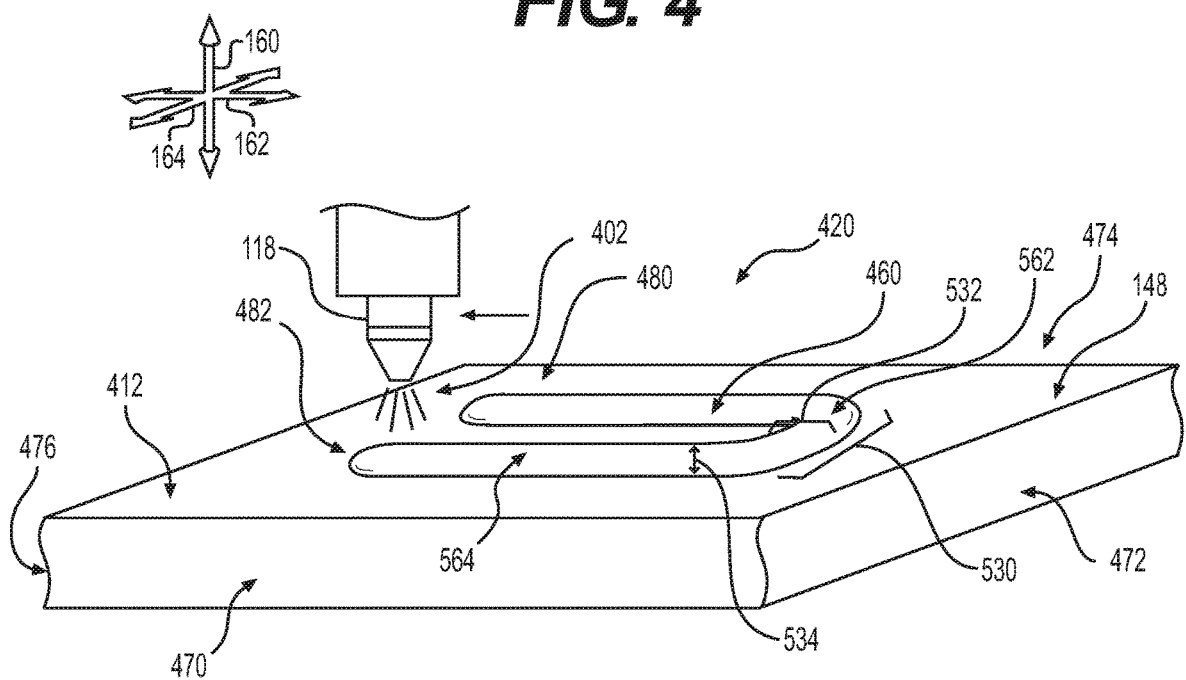
FIG. 5 is a schematic view of an embodiment of a portion of a printing device during operation with a first layer of material.

As printing continues in FIG. 5, the dimensions of first layer 420 can change. In FIG. 5, first layer 420 comprises first elongated portion 460, a second elongated portion 562, and a third elongated portion 564. Second lower layer end 482 is now disposed nearer to fourth side 476, though spaced apart from first lower layer end 480. In other words, nozzle 118 has moved in a direction substantially aligned with second direction 162 to form first elongated portion 460, then moved in a direction substantially aligned with third direction 164 to form second elongated portion 562. In order to form third elongated portion 564, nozzle 118 again moves in a direction substantially aligned with second direction 162. Thus, in the embodiment of FIG. 5, first layer 420 has a substantially U-shaped or curved shape. In other embodiments, nozzle 118 may move in any other direction to form a traced element, including directions that are diagonal relative to first direction 160, second direction 162, or third direction 164. The overall shape of first layer 420 may therefore vary widely from the shape depicted in FIG. 5. For purposes of this description and the claims, the path upon print surface 148 that receives the deposition of the polymer layer (here first layer 420) may be referred to as a first polymer-trace path. In other words, a polymer-trace path refers to the specific arrangement and/or orientation of the polymer layer in forming the traced element.

It should be understood that in different embodiments, each portion of first layer 420 may differ from shown here, and the embodiments of FIGS. 4-10 are for illustrative purposes only. In FIG. 5, second elongated portion 562 has a second length 530, a second width 532, and a second thickness 534. In different embodiments, first length 430 (shown in FIG. 4) and second length 530 (shown in FIG. 5) may be substantially similar, or may differ. In FIG. 5, second length 530 is substantially smaller than first length 430 as shown in FIG. 4. Furthermore, first width 432 (see FIG. 4) and second width 532 (as shown in FIG. 5) may be substantially similar, or may differ. In FIGS. 4 and 5, first width 432 and second width 532 are substantially similar. In addition, first thickness 434 and second thickness 534 may be substantially similar, or may differ. In FIGS. 4 and 5, first thickness 434 and second thickness 534 are substantially similar.

In some embodiments, a traced element may integrate or otherwise include a filamentous or filiform-like element that provides an additional or intermediate strand layer to the traced element. This can be seen in FIGS. 6-8, where a first textile strand 624 comprising a length of thread 602 is being drawn across and deposited over an upper surface 620 of first layer 420. It should be understood that in other embodiments, the strand layer disposed between a first polymer layer and a second polymer layer may comprise more than one textile strand. In some embodiments, there may be a plurality of textile strands, which may each be made of substantially similar materials, or may differ from one another. In some embodiments, thread 602 may be tacked or otherwise joined to a region of first layer 420, and/or utilize methods or features disclosed in the Tack and Drag application. Thus, in some embodiments, at least a portion of the material of the textile strand can be unattached to the first polymer layer.

In other embodiments, first textile strand 624 may be deposited directly along upper surface 620 while nozzle 118 moves over first layer 420, effectively "draping" the continuous thread over first layer 420. In different embodiments, there may be portions of first layer 420 that do not receive or contact first textile strand 624. Thus, in some embodiments, first textile strand 624 may be discontinuous, intermittent, and/or spaced apart from other portions of material comprising first textile strand 624 that are deposited.

For purposes of this disclosure, a textile strand or thread 602 may be understood to refer to a fiber or filament that are a similar type of material, ranging in length from one millimeter to several centimeters or more. Accordingly, textile strands referred to herein may generally have any length. As an example, therefore, first textile strand 624 may have a length that ranges from one millimeter to hundreds of meters or more.

In addition, textile strands or threads can include any of the materials described in the Tack and Drag case or the Thread Composition applications. Furthermore, in some embodiments, textile strands used herein may comprise any kind of tensile strand material. The materials utilized for the textile strands may be selected to have various stretch properties, and in some embodiments the materials may be considered elastomeric. In some cases, a textile strand may stretch between 10 percent to more than 800 percent prior to tensile failure. For many articles of apparel, in which stretch is an advantageous property, textile strands may stretch at least 100 percent prior to tensile failure. As a related matter, the materials utilized for textile strands may be selected to have various recovery properties. That is, an upper may be formed to return to an original shape after being stretched, or an upper may be formed to remain in an elongated or stretched shape after being stretched.

In different embodiments, textile strands may be formed from any generally one-dimensional material exhibiting a length that is substantially greater than a width and a thickness. Depending upon the material utilized and the desired properties, textile strands may be individual yarns that include a plurality of filaments, or threads that include a plurality of yarns. In some embodiments, suitable materials for textile strands include rayon, nylon, polyester, polyacrylic, silk, cotton, carbon, glass, aramids (e.g., para-aramid fibers and meta-aramid fibers), ultra-high molecular weight polyethylene, and liquid crystal polymer, or a polytetrafluoroethylene material, for example.

In comparison with the polymer material comprising first layer 420 as well the second layer (as will be illustrated in FIGS. 9 and 10) many of the materials noted above for textile strands or threads exhibit greater tensile strength and stretch resistance. That is, textile strands may be stronger than first layer 420 and may exhibit less stretch than first layer 420 when subjected to a tensile force. The combination of the polymer material surrounding or encasing textile strands imparts a structure wherein the composite traced element may stretch in one direction and is substantially stretch resistant and has more strength in another direction. However, in other embodiments, textile strands may be formed from materials that stretch significantly. Textile strands may also be utilized to impart other properties to the composite element. For example, textile strands may be located within two polymer layers to impart a particular aesthetic.

Figure 6:
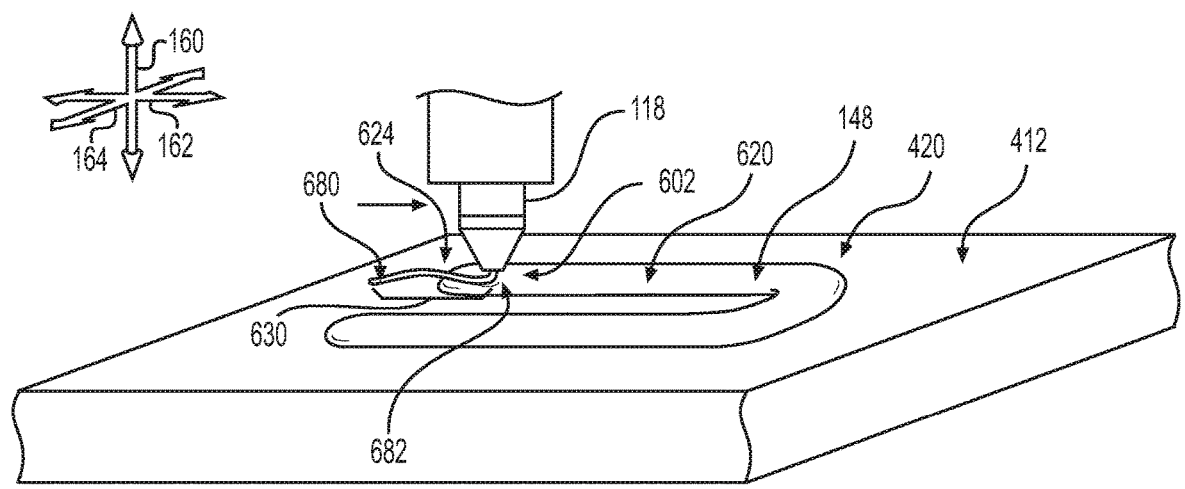
FIG. 6 is a schematic view of an embodiment of a portion of a printing device during operation with a first layer of material and a strand layer.
Figure 7:
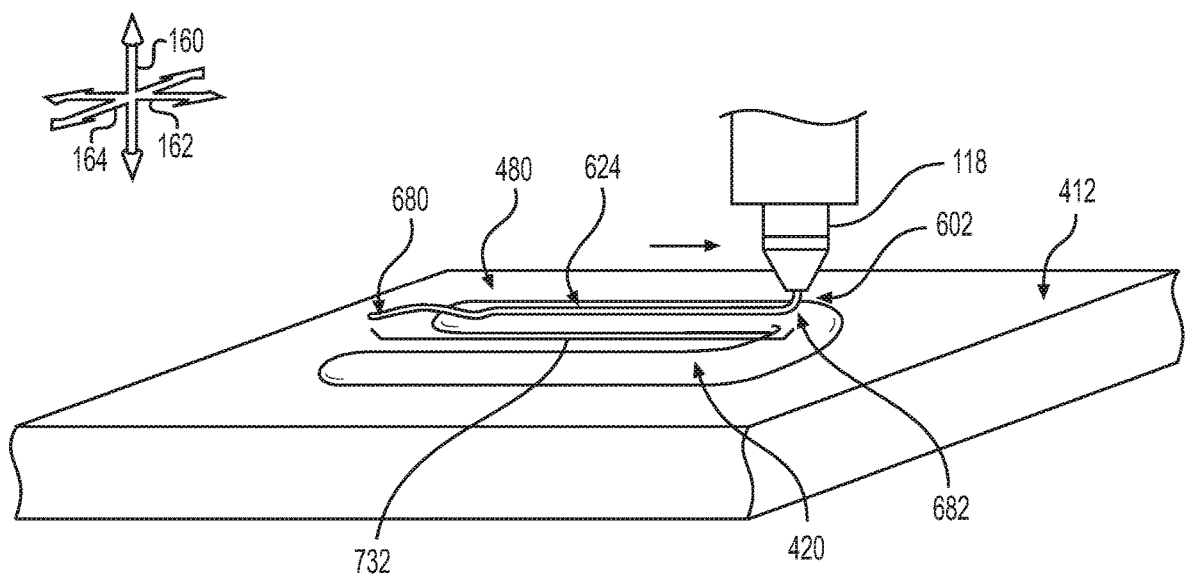
FIG. 7 is a schematic view of an embodiment of a portion of a printing device during operation with a first layer of material and a strand layer.
Figure 8:
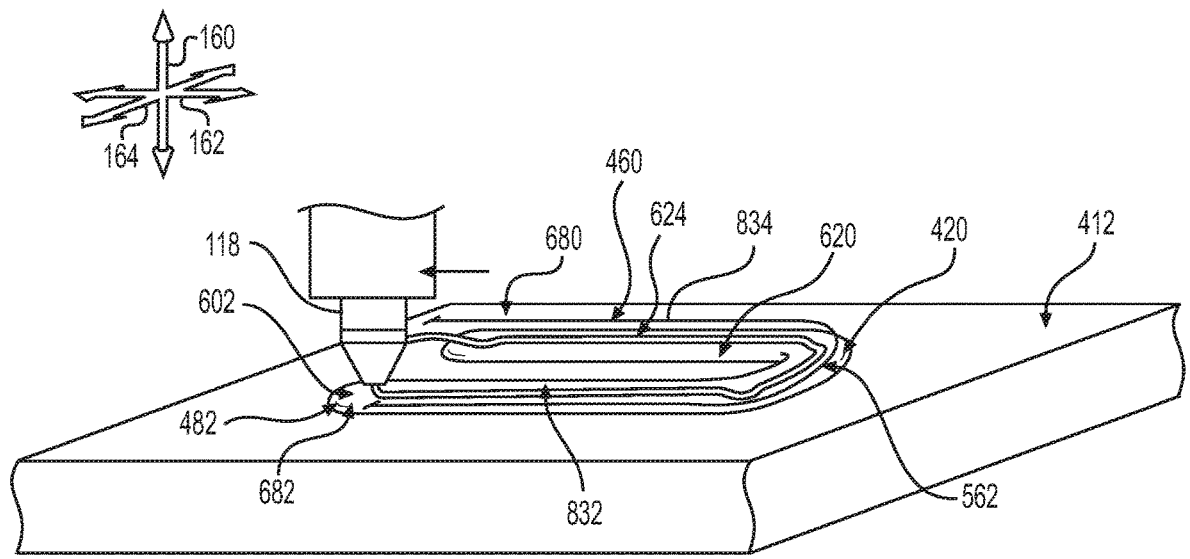
FIG. 8 is a schematic view of an embodiment of a portion of a printing device during operation with a first layer of material and a strand layer.

Referring again to FIG. 6, it may be seen that first textile strand 624 extends from a first textile strand end 680 to a second textile strand end 682. Second textile strand end 682 is disposed further from first lower layer end 480 relative to first textile strand end 680. In FIG. 6, first textile strand 624 has a first textile strand length 630 extending between first textile strand end 680 and second textile strand end 682. As printing continues in FIG. 7, the length of first textile strand 624 increases to a second textile strand length 732 that is greater than first textile strand length 630 of FIG. 6. Similarly, in FIG. 8, as nozzle 118 continues to deposit first textile strand 624 over first layer 420, the length of first textile strand 624 increases from second textile strand length 732 to a third textile strand length 834. In FIG. 8, second textile strand end 682 is now disposed adjacent to second lower layer end 482. In other words, the arrangement or placement of first textile strand 624 is substantially similar to the arrangement of first layer 420.

Thus, as shown herein, in some embodiments, two or more layers can be substantially aligned or matched in their arrangement. For purposes of this description and the claims, the particular path on a print surface that receives the deposition of the filament (here first textile strand 624) may be referred to as a "strand-trace path." In other words, a strand-trace path refers to the specific arrangement and/or orientation of the strand (second) layer in forming or printing the traced element. In FIG. 8, it can be seen that first textile strand 624 is printed along a substantially similar arrangement or path as first layer 420, such that each of first elongated portion 460, second elongated portion 562, and third elongated portion 564 contact a portion of first textile strand 624. In some embodiments, first textile strand 624 may be understood to "trace" the overall path of first layer 420. In some embodiments, the first polymer-trace path may be substantially similar to the strand-trace path over at least some portions of the traced element. In some embodiments, a majority of the strand-trace path may align with the first polymer-trace path. For purposes of this disclosure, a traced element refers to a printed structure in which two or more distinct layers have paths with overlapping or aligned printed portions, as shown in FIG. 8.

Furthermore, in different embodiments, first textile strand 624 can vary in size relative to first layer 420. For example, in FIG. 8, first textile strand 624 includes a textile strand width 832. Textile strand width 832 is substantially smaller than the width of first layer 420 (see first width 432 of FIG. 4 and second width 532 of FIG. 5). In some embodiments, an average width of first textile strand 624 is at least 5 percent of an average width of the first layer 420. In other embodiments, the average width of first textile strand 624 can be at least 5-10 percent of the average width of the first layer 420. In some other embodiments, the average width of first textile strand 624 can be at least 10-30 percent of the average width of the first layer 420. In one embodiment, the average width of first textile strand 624 can be between 25 and 50 percent of the average width of the first layer 420.

First layer 420 in FIG. 8 is shown with a portion of first textile strand 624 disposed upon part of upper surface 620. Following the printing and formation of first layer 420 with first textile strand 624, one or more additional layers may be added to the traced element. In some embodiments, as printing continues (shown in FIGS. 9 and 10), one or more portions of first textile strand 624 may be enclosed or at least partially enclosed within the traced element. Some embodiments of this process will be described in further detail below.

Figure 9:
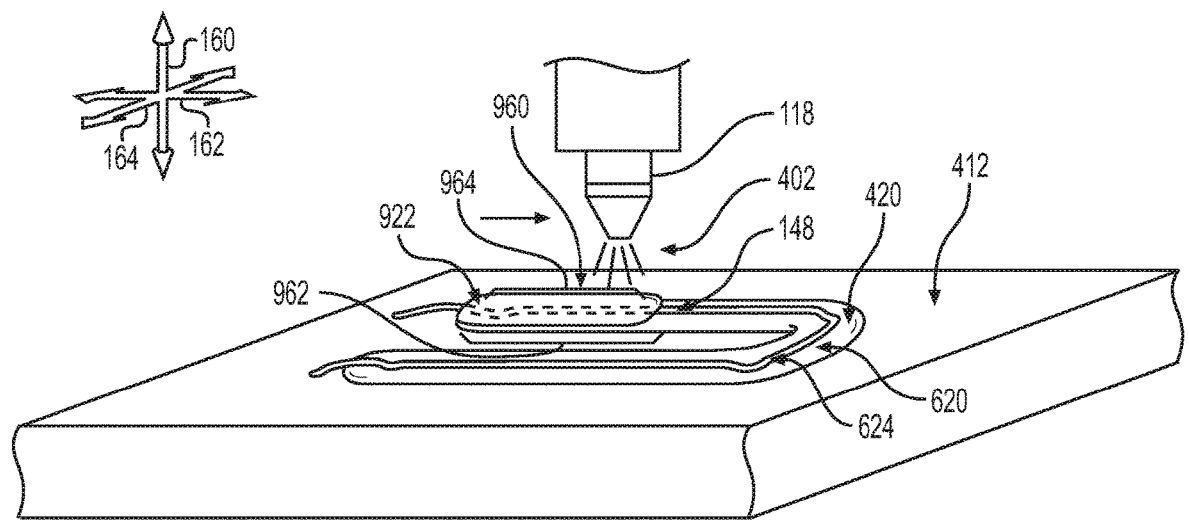
FIG. 9 is a schematic view of an embodiment of a portion of a printing device during operation with a first layer of material, a strand layer, and a second layer of material.

Referring to FIG. 9, a second layer 922 is being formed. Nozzle 118 is shown emitting droplets 402 that include a polymer material. In some embodiments, second layer 922 can be deposited by nozzle 118 in a substantially similar manner as first layer 420. In other embodiments, the deposition may occur through other means. Furthermore, in some embodiments, the material of first layer 420 and second layer 922 may differ or may be substantially similar, depending on the characteristics and properties desired.

In FIG. 9, a first segment 960 of second layer 922 has been printed over a portion of the traced element depicted in FIG. 8. It can be seen that first segment 960 substantially overlaps or is aligned with a corresponding second segment 962 of first layer 420. Furthermore, a third segment 964 of first textile strand 624 has been entirely encased or surrounded by first segment 960 and second segment 962. At least a portion of second layer 922 is in direct contact with upper surface 620 in FIG. 9. In some embodiments, portions of second layer 922 may adhere directly to portions of first layer 420. In some embodiments, first layer 420 is polymer bonded to second layer 922. In one embodiment, first layer 420 is polymer bonded to second layer 922 while both have an interior portion that is adjacent to and contacts first textile strand 624.

Figure 10:
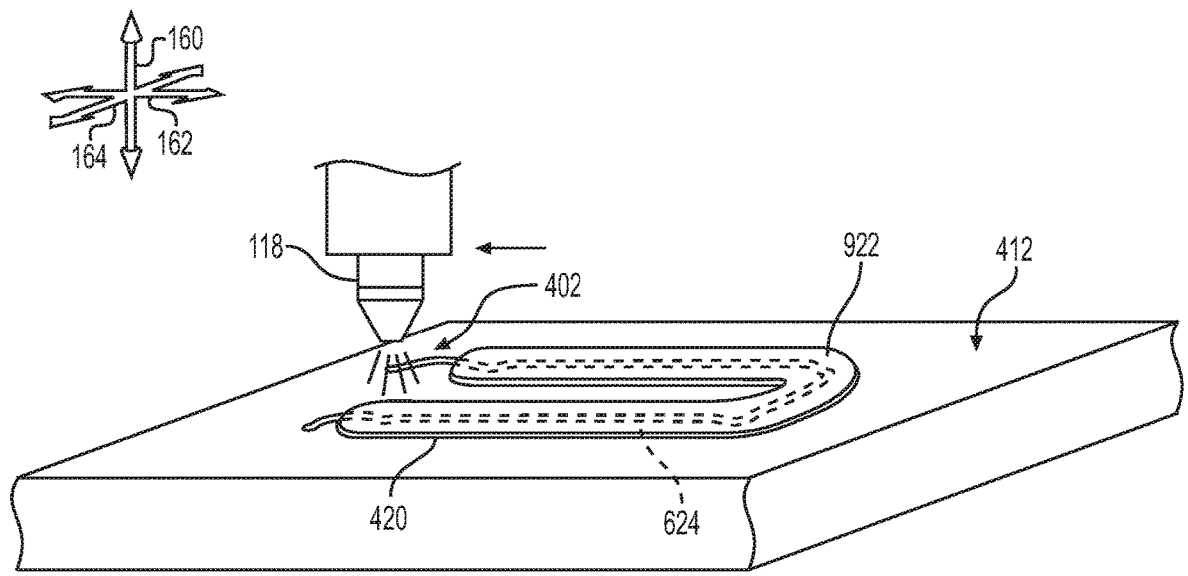
FIG. 10 is a schematic view of an embodiment of a portion of a printing device during operation with a first layer of material, a strand layer, and a second layer of material.

As printing continues in FIG. 10, second layer 922 is shown to have a substantially U-shaped or curved shape. In other embodiments, the overall shape of second layer 922 may vary widely from the shape depicted in FIG. 10. For purposes of this description and the claims, the path upon the print surface (where the print surface comprises both an upper surface of first layer 420 and first tensile strand 624 in FIGS. 9 and 10) that receives the deposition of the subsequent polymer layer (second layer 922) may be referred to as a second polymer-trace path. In some embodiments, second layer 922 may be understood to "trace" the same overall path taken to form first layer 420 and/or first textile strand 624. In one embodiment, the first polymer-trace path may be substantially similar to the second polymer-trace path in at least some portions of the traced element. In some embodiments, a majority of the second polymer-trace path may align with the first polymer-trace path. In one embodiment, a majority of the second polymer-trace path may align with the first polymer-trace path as well as with the strand-trace path. Thus, for purposes of this disclosure, FIG. 10 depicts an embodiment of a traced element in which three distinct layers have paths with overlapping or aligned printed portions.

For purposes of reference, in some embodiments, the traced elements as described herein may be described as comprising an inner portion and an outer portion, where the inner portion is formed from at least the first polymer layer, and where the outer portion is formed from at least the second polymer layer. Together, the inner portion and the outer portion can encase at least a portion of the textile strand.

In embodiments where the two polymer-trace paths are aligned or overlap, as shown in FIG. 10, the substantial entirety of the upper surface of first layer 420 (see FIG. 9) can be covered by second layer 922. Furthermore, in embodiments where the second polymer-trace path is aligned with or overlaps the strand-trace path, nearly all of the upper surface first textile strand 624 can be covered by second layer 922. In addition, in embodiments where the two polymer-trace paths (i.e., first polymer-trace path and second polymer-trace path) are aligned or overlap and there is overlap with the strand-trace path, first textile strand 624 can be surrounded by a casing formed by first layer 420 and second layer 922, as shown in FIG. 10.

Thus, as shown herein, in some embodiments, a textile strand may be sandwiched or encased between two layers of a traced element. For purposes of this description, a textile strand is partially encased when at least a portion of the textile strand is entirely covered by adjacent layers of the traced element. A textile strand is fully enclosed when the textile strand is fully located within two layers of a traced element, such that the entire surface area of the textile strand is surrounded by adjacent layers of the traced element. In other words, portions of a textile strand that are fully encased have no portion or surface area exposed. In some embodiments, the first layer and the second layer can form a casing around portions of the textile strand, as shown in FIG. 10.

It should be understood that in different embodiments, each portion of second layer 922 may differ from shown here, and that the embodiments of FIGS. 9-10 are for illustrative purposes only. In addition, the dimensions of second layer 922 may differ from that of first layer 420, or they may be substantially similar. For example, in FIG. 10, the average length, average width, and average thickness of first layer 420 and the average length, average width, and average thickness of second layer 922 may each be substantially similar, or may differ in different embodiments. In FIG. 10, the average length of first layer 420 and the average length of second layer 922 are substantially similar. Furthermore, the average width of first layer 420 and the average width of second layer 922 may be substantially similar, or may differ in different embodiments. In FIG. 10, the average width of first layer 420 and the average width of second layer 922 are substantially similar in different embodiments. In addition, the average thickness of first layer 420 and the average thickness of second layer 922 may be substantially similar, or may differ. In FIG. 10, the average thickness of first layer 420 and the average thickness of second layer 922 are substantially similar. Thus, the traced element of FIG. 10 includes first layer 420 and second layer 922 with substantially similar dimensions and polymer-trace paths.

Figure 11:
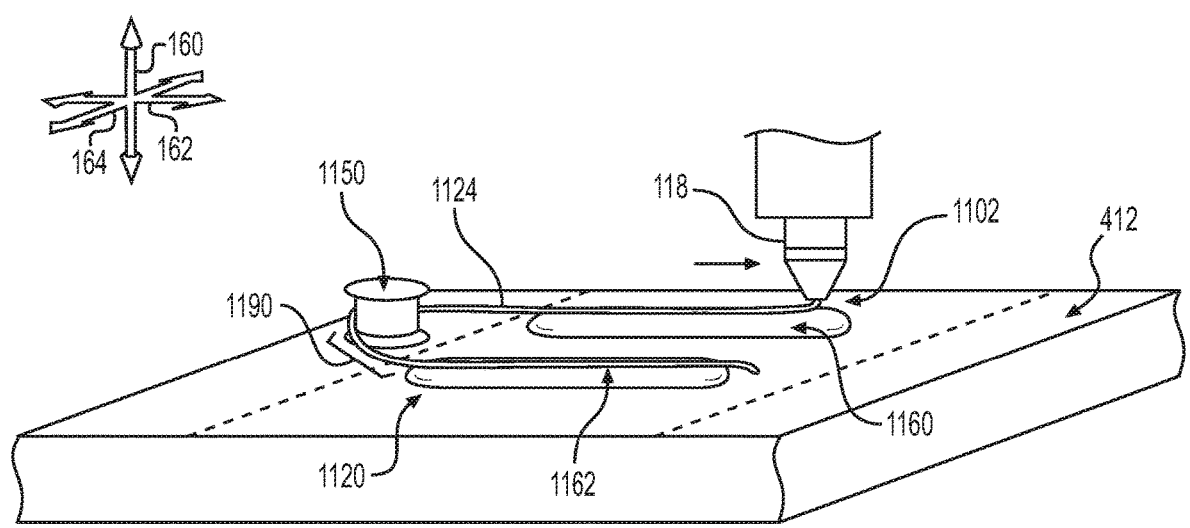
FIG. 11 is a schematic view of an embodiment of a portion of a printing device during operation with a first layer of material and a strand layer.

Other embodiments may include different steps or structural configurations. For example, in FIG. 11, an alternative embodiment of a process for forming a traced element is shown. In FIG. 11, a first layer 1120 comprising a first elongated portion 1160 and a second elongated portion 1162 has been formed on platform 412. In contrast to the embodiments of FIGS. 4-10, first layer 1120 is discontinuous, such that first elongated portion 1160 and second elongated portion 1162 are spaced apart. In FIG. 11, first elongated portion 1160 and second elongated portion 1162 are arranged generally parallel to one another. While first elongated portion 1160 and second elongated portion 1162 are not continuous, it should be understood that each portion is associated with a polymer-trace path of first layer 1120. Thus, when a thread 1102 of a second textile strand 1124 is deposited over either of first elongated portion 1160 or second elongated portion 1162, it can be understood to overlap with portions of the polymer-trace path of first layer 1120.

Furthermore, in FIG. 11, an anchoring element 1150 is shown along one side of platform 412. Anchoring element 1150 can vary in different embodiments, and can include a spool-like structure, a cylinder, or any other type of component that can be used to securely loop a portion of the textile strand during printing. In some embodiments, anchoring element 1150 can be used to help form exposed region(s) of second textile strand 1124 disposed or extending outside of the casing formed between a first layer and a second layer (see FIG. 10). In addition, while a traced element may include an exposed region 1190, there may still be alignment between the trace paths of each layer. For example, it should be understood that in FIG. 11, second textile strand 1124 has a strand-trace path that overlaps with the polymer-trace path of first layer 1120.

It should further be understood that the embodiments described above with respect to the traced elements and their incorporation in between polymer layers and/or upper components may also include textile strands that are not fixed in place. In other words, printing system 100 (see FIG. 1) may form composite traced elements with operative strand elements. Operative strand elements can include portions that are moveable relative to another portion of the operative strand element. As shown through FIGS. 12-15, a textile strand may be disposed within a traced element. In one embodiment, the textile strand may be configured to move or slide through the casing formed by the first layer and the second layer. Thus, in some embodiments, an upper component of the embodiments disclosed herein can include a textile strand where at least a portion of the textile strand is unattached to the first polymer layer and/or the second polymer layer.

In some embodiments, for example, composite traced elements may be designed to provide guide tubes or routing components for a lacing system in an article of footwear. Thus, in some cases, a user may be able easily to tighten or loosen the laces (i.e., the textile strands) disposed within the printed guide tubes.

A variety of elements may be disposed within a traced element while retaining the ability to slide or translate through the traced element. In one embodiment, a textile strand may be able to slide or be moved translationally (back and forth) through the traced element. This may provide the traced element with the ability to act as a support, guide, router, covering, protection, sleeve, tube, anchor, or other such component for a portion of the textile strand, while the textile strand itself remains capable of movement through the traced element.

The printing system may provide for the translation of elements in the traced elements in a variety of ways. In some embodiments, the polymer material can be printed onto a base material or base layer from which the polymer can be released without breaking. Furthermore, in some embodiments, the materials comprising the polymer layers may be different from the material comprising the textile strands. In some cases, the materials of either or both of the polymer material and textile strands may be resistant to adhesion. In different cases, the use of dissimilar or incompatible materials that do not readily bind or adhere to one another, or, in one case, materials that repel binding, may be used in each of the polymer layers and/or the textile strands. In some embodiments, the polymer material may comprise of a material that resists adhesion to the base layer. In one embodiment, the base layer material may comprise a material that resists adhesion to the polymer material and/or the textile strands. In other embodiments, the textile strand may comprise a material that resists adhesion to the polymer material. In one embodiment, the textile strands could comprise one or more materials that include lower friction coefficients, such as materials with friction coefficients in the range of 0.01 and 0.30. In other embodiments, the polymer layer material may comprise a material that resists adhesion to the textile strand. In one embodiment, the polymer material could comprise a material with lower friction coefficients, such as material with a friction coefficient in the range of 0.01 and 0.30.

Furthermore, in other cases, various portions of the textile strands or the interior of the polymer layers may be coated with or otherwise include a non-stick material or a low friction material. Some examples of low friction materials include, but are not limited to, polymer coatings, fluorocarbons, polytetrafluoroethylene (PTFE) (e.g., Teflon), fluorinated ethylene propylene (FEP), perfluoroalkoxy (PFA), Delrin, paints and elastomeric coatings, anodized aluminum, phenolics, acetals, polyimides, polysulfone, polyphenylene sulfide, plastics, metallic materials, ceramics, silicone, enameled cast iron, seasoned cast iron, nylon, and/or other materials. In some instances, the coatings or material included in the textile strands or polymer material can comprise thermoplastics or thermoplastic polymers. In other cases, the materials used may comprise thermosets.

Figure 12:
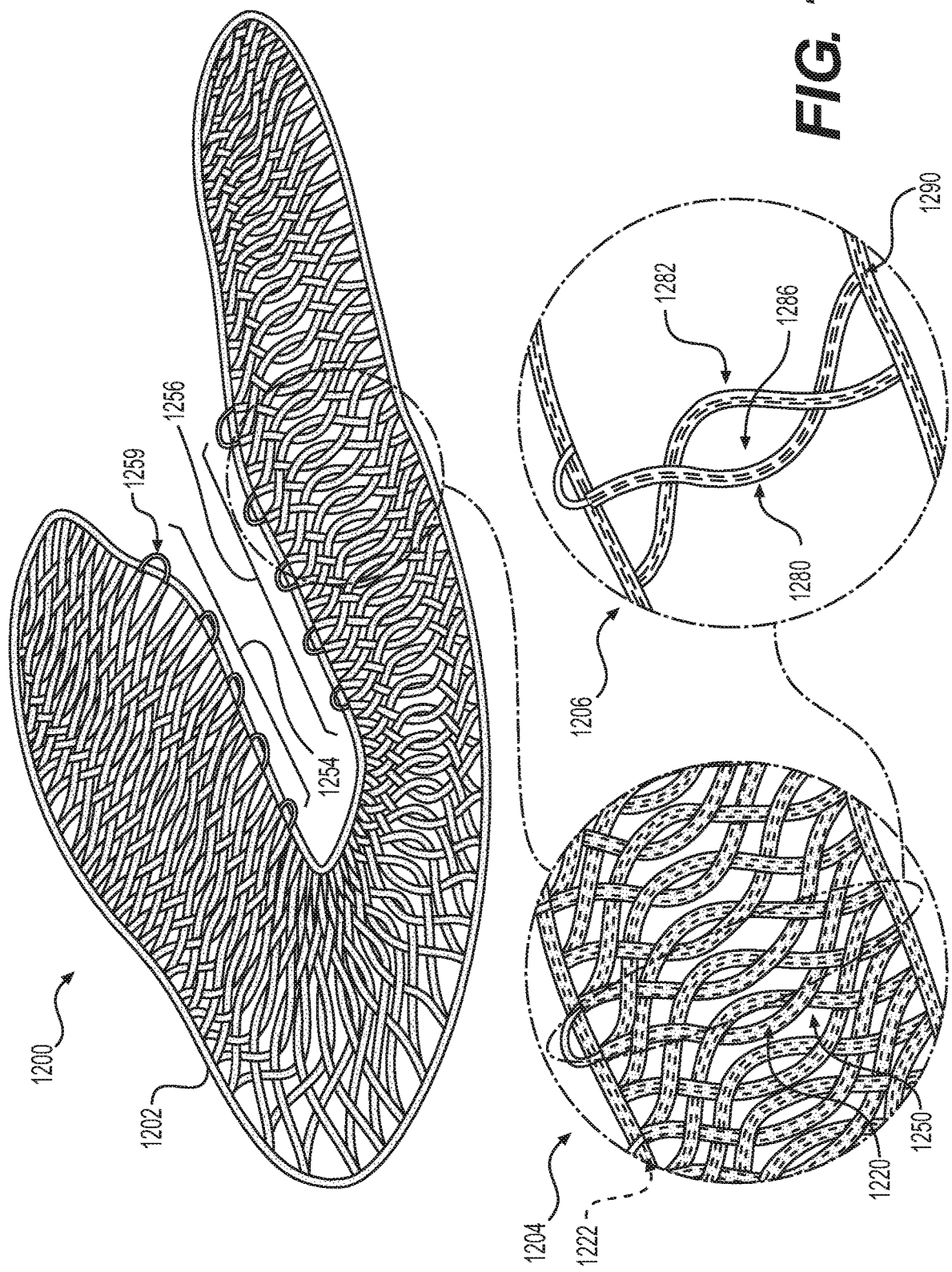
FIG. 12 is an isometric view of an embodiment of a traced element.

In different embodiments, the methods described herein can be utilized to form a wide range of layered configurations. Referring now to FIGS. 12-15, a few examples are illustrated of this range. In FIG. 12, a first upper component 1200 is shown. For purposes of this disclosure, an "upper component" is a portion of or an entirety of an upper for an article of footwear in the unassembled state. In the embodiments shown in FIGS. 12-15, upper components are depicted in a flattened configuration. However, in other embodiments, an upper component may be formed in a manner that is not flat. In some embodiments, each upper component may be incorporated in its entirety as an upper for an article of footwear. In other embodiments, an upper component can comprise a portion of an upper for an article of footwear. In one embodiment, as shown in FIG. 12, a portion of or all of peripheral boundary 1202 of first upper component 1200 can be defined by the composite traced element comprising two polymer layers and a tensile strand layer. A magnified view 1204 depicts a portion of first upper component 1200 as comprising a strand layer 1222 surrounded by a polymer casing 1220. In some embodiments, polymer casing 1220 comprises a first polymer layer and a second polymer layer, as described in FIG. 10.

In FIG. 12, the first polymer layer of polymer casing 1220 defines a first polymer-trace path, and strand layer 1222 (shown in dotted line) is a strand extending along a strand-trace path that is aligned with the first polymer-trace path. Furthermore, the second polymer layer has a second polymer-trace path aligned with at least a portion of the first polymer-trace path of the first polymer layer, and overlaps both the first polymer layer and strand layer 1222 for at least a portion of the second polymer-trace path.

In some embodiments, the polymer-trace path and the strand-trace path can intersect at an angle in a plurality of positions of first upper component 1200, as shown in magnified view 1204. In different embodiments, because of the multiple elongated portions of first casing 1220, a plurality of polymer-trace path portions can be formed in first upper component 1200. For purposes of illustration, a first polymer-trace path portion 1280 and a second polymer-trace path portion 1282 are identified in an isolated view 1206. In some embodiments, each polymer-trace path portion can represent a continuous printing of a segment of the first polymer layer or the second polymer layer from one peripheral (outer) edge to another peripheral (outer) edge of the upper component.

In addition, as seen in FIG. 12, first upper component 1200 includes a plurality of openings 1250 surrounded or bounded by the edges of each portion. In other words, the arrangement of the traced element of first upper component 1200 is such that portions of the structure are spaced apart from one another, forming gaps of no material within first upper component 1200. Each opening of plurality of openings 1250 can vary in size (i.e., area) and shape from one another in some embodiments. Thus, in one embodiment, first upper component 1200 can include a lattice-like structure, in which portions of the stacked layers intersect and diverge.

Furthermore, the shape of each portion can vary in different embodiments. In FIG. 12, it can be seen that a polymer-trace path portion can be linear in some embodiments, as with a first peripheral edge portion 1290, or a polymer-trace path can comprise a plurality of curvilinear portions, as with each of first polymer-trace path portion 1280 and second polymer-trace path portion 1282. In some cases, each polymer portion can intersect or overlap to form an aperture or opening, as with a first opening 1286 formed by the intersections between first polymer-trace path portion 1280 and second polymer-trace path portion 1282. In FIG. 12, each segment of the polymer-trace paths of first casing 1220 overlaps with a strand-trace path (depicted in dotted line). However, in other embodiments, there may be portions of polymer-trace paths that do not overlap with strand-trace paths, as will be discussed further below with respect to FIG. 14.

In addition, as shown in FIG. 12, first upper component 1200 can include one or more lace aperture loops 1259 in some embodiments. For example, first upper component 1200 has a medial set 1254 of lace aperture loops 1259 and a lateral set 1256 of lace aperture loops 1259. Each lace aperture loop corresponds to an exposed region of a strand layer, similar to exposed region 1190 of FIG. 11. In some embodiments, one or more of lace aperture loops 1259 can be configured to receive or interact with a lace or other tensile element for an article of footwear when first upper component 1200 is assembled in an article of footwear. However, in other embodiments, an upper component may include fewer or greater number of lace aperture loops 1259. Furthermore, in some embodiments, an upper component may not include any lace aperture loops.

Figure 13:
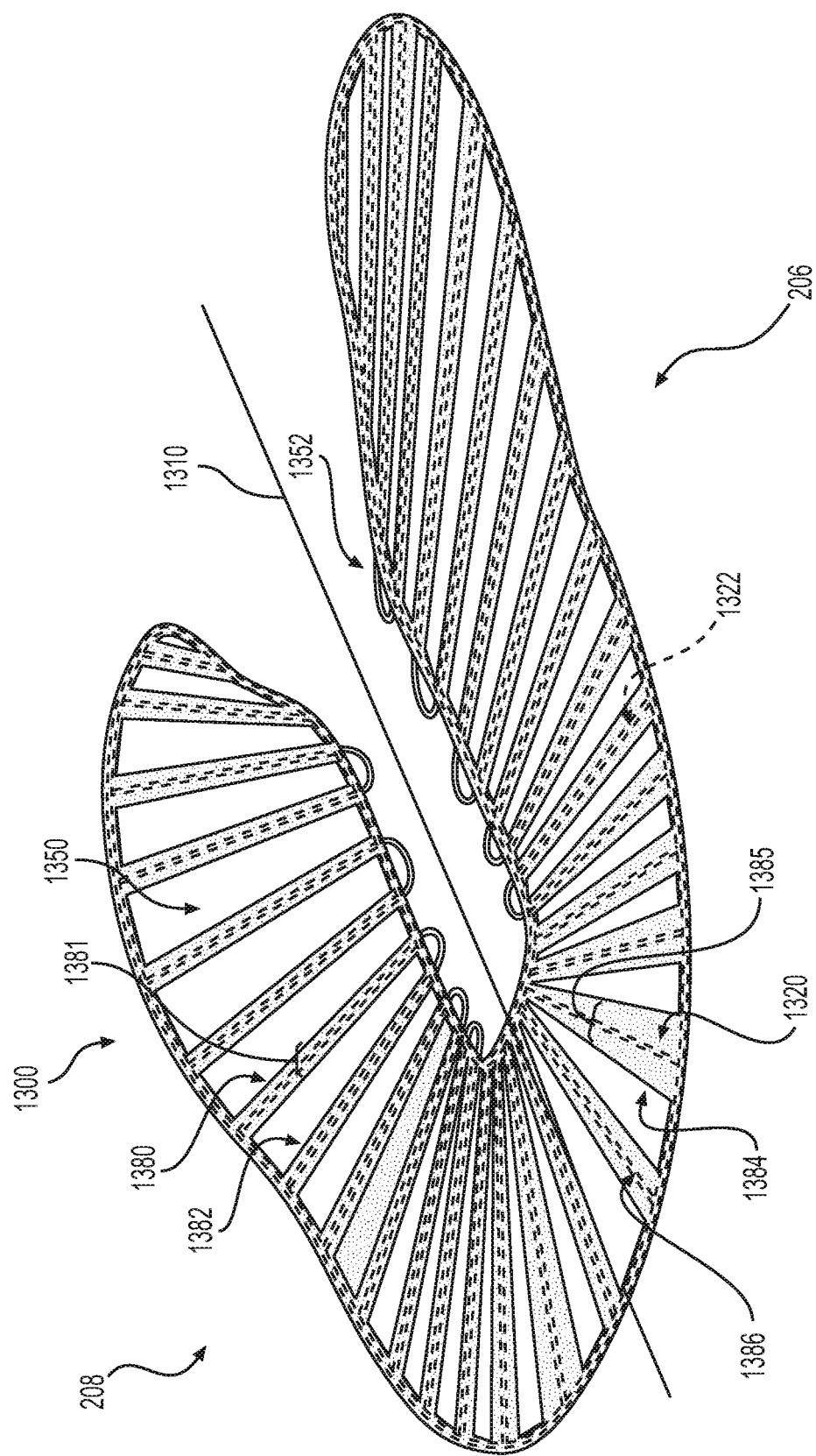
FIG. 13 is an isometric view of an embodiment of a traced element.

In other embodiments, the arrangement of each layer may differ. In FIG. 13, a second upper component 1300 is shown, including a polymer casing 1320 surrounding a strand layer 1322. In FIG. 13, the polymer layers of polymer casing 1320 define at least one polymer-trace path, and strand layer 1322 comprises a material strand disposed along a strand-trace path extending over the polymer casing 1320. Furthermore, polymer casing 1320 overlaps strand layer 1322 for at least a portion of its polymer-trace paths. In addition, in some embodiments, the strand-trace path extends along at least some portions of the polymer-trace path of polymer casing 1320.

In some embodiments, the polymer-trace path and the strand-trace path can intersect at an angle in a plurality of positions of second upper component 1300. For purposes of clarity, because of the multiple elongated portions of polymer casing 1320, a plurality of polymer-trace and overlapping strand-trace paths associated with different portions of the traced element can be identified in second upper component 1300. For example, in FIG. 13, a first trace path 1380, a second trace path 1382, a third trace path 1384, and a fourth trace path 1386 are identified. It can be seen that each of first trace path 1380, second trace path 1382, third trace path 1384, and fourth trace path 1386 are substantially linear. Furthermore, each of first trace path 1380, second trace path 1382, third trace path 1384, and fourth trace path 1386 may be understood to radiate outward from a center line 1310 of second upper component 1300.

In FIG. 13, each of the polymer-trace paths of polymer casing 1320 overlap with a strand-trace path. In other words, the entirety of the polymer-trace paths of second upper component 1300 include the overlapping arrangement of polymer casing 1320 and strand layer 1322. However, in other embodiments, there may be portions of or entire polymer-trace paths that do not overlap with strand-trace paths, as will be discussed further below with respect to FIG. 14.

In addition, as seen in FIG. 13, second upper component 1300 includes a plurality of openings 1350 surrounded or bounded by the edges of polymer casing 1320. In other words, the arrangement of polymer casing 1320 and strand layer 1322 is such that portions of the composite structure are spaced apart from one another, forming gaps of no material within second upper component 1300. As described with respect to FIG. 12, each opening of plurality of openings 1350 can vary in size (i.e., area) and shape from one another in some embodiments. Thus, in one embodiment, second upper component 1300 can include a "ladder-like" structure, in which portions of the layers of the traced element form the "rungs" and are spaced apart from one another. The spacing between each "rung" can differ in different embodiments.

In addition, in some embodiments, as shown in FIG. 13, second upper component 1300 can include one or more lace aperture loops 1352. For example, second upper component 1300 has a medial set of lace aperture loops 1352 and a lateral set of lace aperture loops 1352. Each lace aperture loop corresponds to an exposed region of a strand layer, similar to exposed region 1190 of FIG. 11. In some embodiments, one or more of lace aperture loops 1352 can be configured to receive or interact with a lace or other tensile element for an article of footwear when second upper component 1300 is assembled in an article of footwear.

Furthermore, in contrast to FIG. 12, second upper component 1300 provides a substantially symmetrical arrangement. In other words, a medial side 206 of second upper component 1300 is a mirror image of a lateral side 208 of second upper component 1300 with respect to center line 1310.

It can also be seen that the width of the polymer layers can vary in an upper component. For example, first trace path 1380 has a first average width 1381, and third trace path 1384 has a second average width 1385 that is greater than first average width 1381. Thus, in some cases, a tensile strand may comprise a lower proportion of an average width of third trace path 1384 and a higher proportion of an average width of first trace path 1380.

Figure 14:
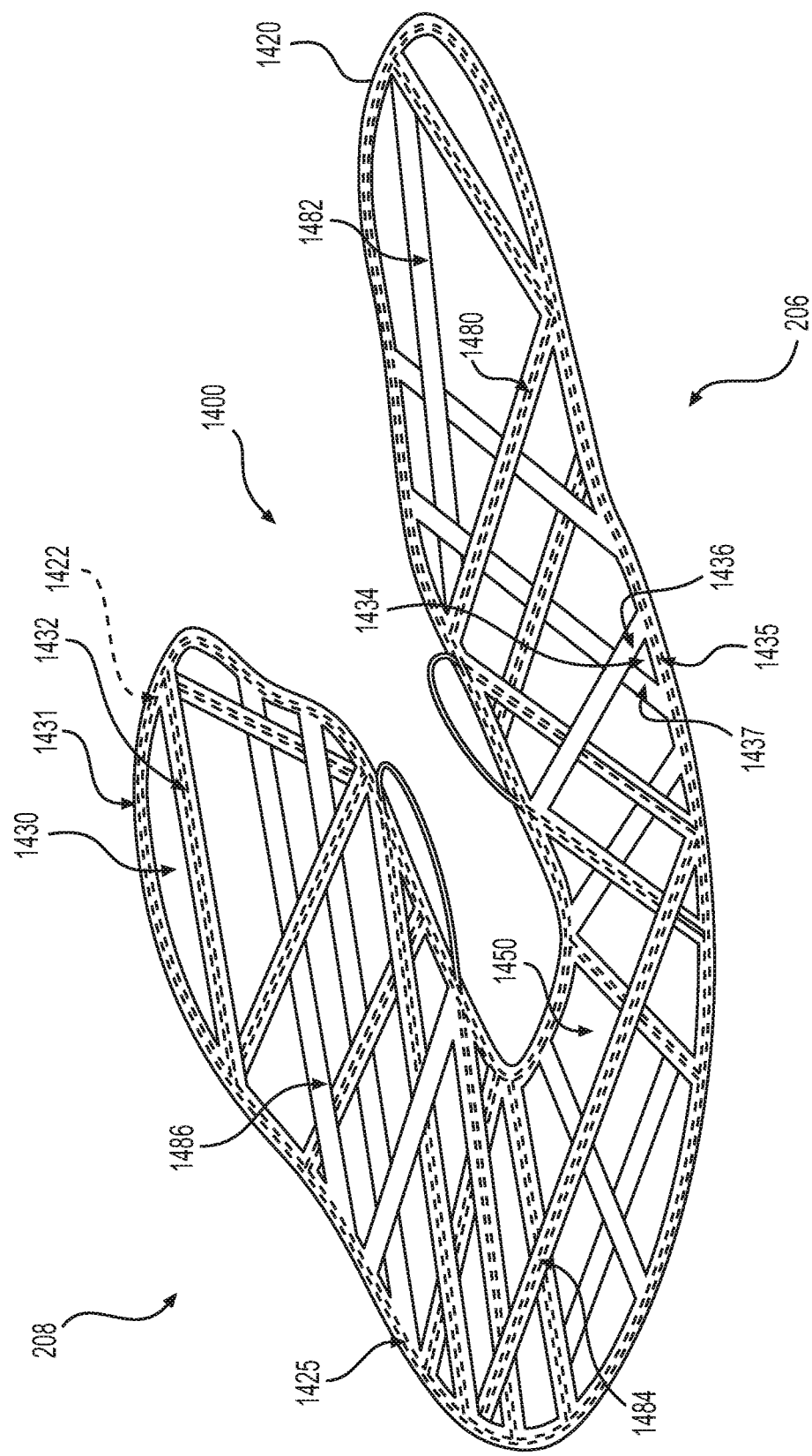
FIG. 14 is an isometric view of an embodiment of a traced element.

Referring now to FIG. 14, a third upper component 1400 is shown, including a polymer casing 1420 and a strand layer 1422. In FIG. 14, for purposes of reference, polymer casing 1420 defines a polymer-trace path, and strand layer 1422 comprises a material strand disposed along a strand-trace path extending over portions of polymer casing 1420. Furthermore, the outer portion layer of polymer casing 1420 overlaps the trace paths of the inner portion layer of polymer casing 1420, and strand layer 1422, for at least a portion of the trace paths. In addition, in some embodiments, the strand-trace path extends along at least some portions of the polymer-trace paths.

In some embodiments, the polymer-trace path and the strand-trace path can intersect at an angle in a plurality of positions of third upper component 1400. In different embodiments, because of the multiple elongated portions of polymer casing 1420, a plurality of polymer-trace paths can be formed in third upper component 1400. For purposes of illustration, a first trace path 1480, a second trace path 1482, a third trace path 1484, and a fourth trace path 1486 are identified. It can be seen that each first trace path 1480, second trace path 1482, third trace path 1484, and fourth trace path 1486 are substantially linear. In FIG. 14, only some of the polymer-trace paths of polymer casing 1420 overlap with a strand-trace path, in contrast to FIGS. 12 and 13. In other words, only some portions of the polymer-trace paths of third upper component 1400 include the overlapping arrangement of polymer casing 1420 surrounding strand layer 1422. For example, it can be seen that while a peripheral border 1425 of third upper component 1400 includes a continuous overlap between the polymer trace path and the strand-trace path, there are several segments extending throughout the interior of third upper component 1400 that do not include a strand layer, including second trace path 1482 and fourth trace path 1486. As shown in FIGS. 13 and 14, segments can extend between different pairs of points of a peripheral segment.

In addition, as seen in FIG. 14, third upper component 1400 includes a plurality of openings 1450 surrounded or bounded by the edges of polymer casing 1420. In other words, the arrangement of polymer casing 1420 is such that portions of the structure are spaced apart from one another, forming gaps where no material is present in third upper component 1400. As mentioned with respect to FIG. 12, each opening of plurality of openings 1450 can vary in size (i.e., area) and shape from one another in some embodiments. For example, a first aperture 1430, which is bounded by a first peripheral segment 1431 and a first linear segment 1432, is larger than a second aperture 1434, which is bounded by a second peripheral segment 1435, a second linear segment 1436, and a third linear segment 1437. In addition, the shapes of each aperture can differ. First aperture 1430 has a generally semicircular or half-teardrop shape, while second aperture 1434 has a generally triangular shape. Each of the apertures can comprise a variety of regular or irregular shapes, corresponding to the polymer-trace paths of each of the polymer layers.

Furthermore, in contrast to FIG. 13, third upper component 1400 of FIG. 14 provides a substantially asymmetrical arrangement. In other words, medial side 208 of third upper component 1400 is not a mirror image of lateral side 206 of third upper component 1400.

Figure 15:
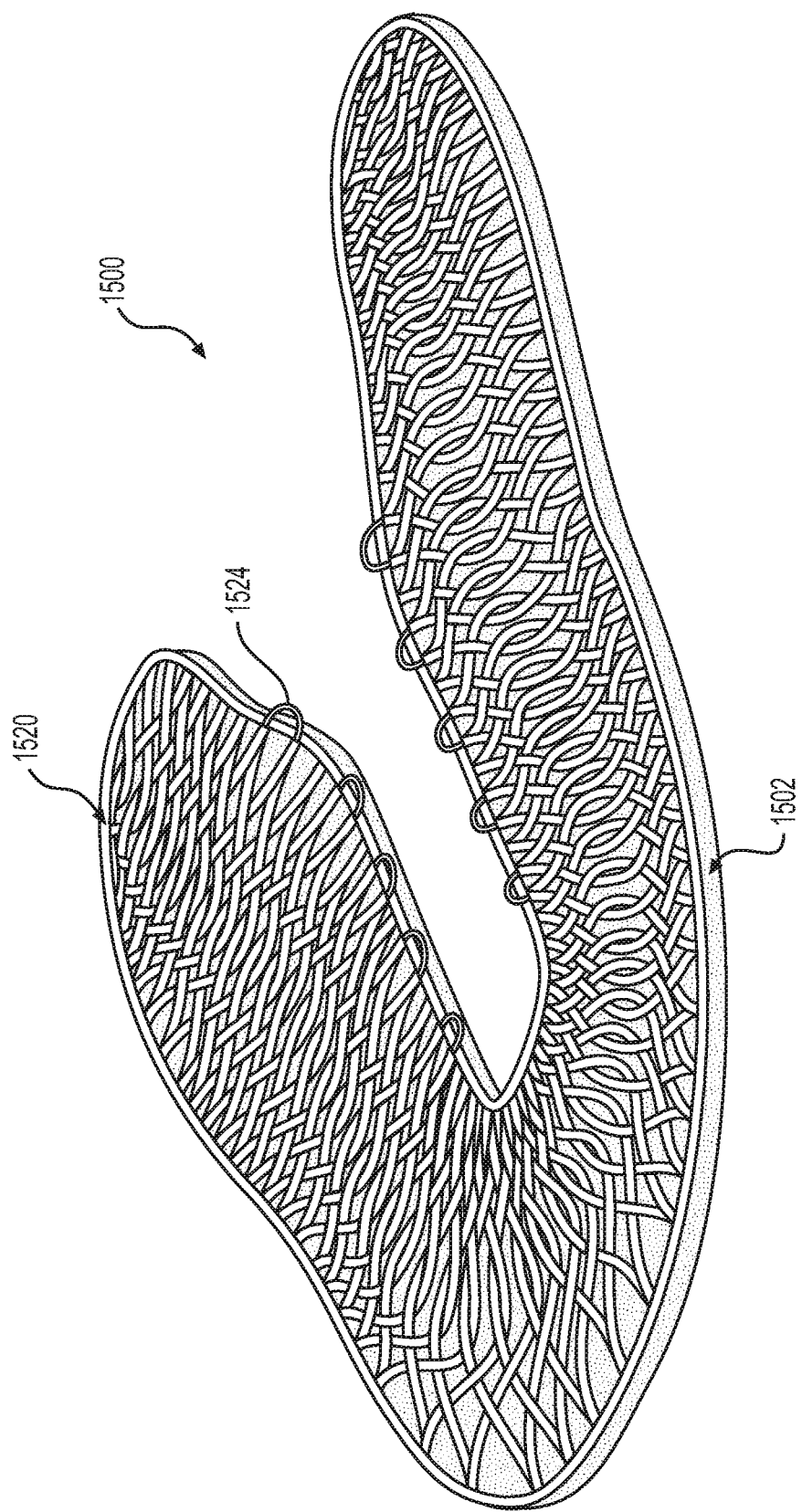
FIG. 15 is an isometric view of an embodiment of a traced element with a base layer.

In different embodiments, the traced element as disclosed herein can be printed or deposited directly onto a base layer. In some embodiments, a base layer can provide greater stability or structural support to a traced element. In some embodiments, the traced element may be printed on and secured to at least a portion of an outer surface of a base layer. However, in other embodiments, the traced element may be initially printed and formed on a tray or platform and then positioned on and secured to a portion of an outer surface of a base layer. Referring now to FIG. 15, another embodiment of an upper component is shown. In FIG. 15, an isometric view of a fourth upper component 1500 is shown comprising a polymer casing 1520, a strand layer 1524, as well as a base layer 1502. Thus, in some embodiments, one surface side of the traced element can be attached or joined to an outer surface of base layer 1502. In some embodiments, a lower surface of the first polymer layer of polymer casing 1520 (corresponding to an outwardly facing surface, or the surface that is opposite to outwardly facing upper surface 620 of first layer 420 depicted in FIG. 6) can be printed upon or positioned against an outer surface of base layer 1502. In another embodiment, an outwardly facing surface of the second polymer layer can be printed upon or positioned against an outer surface of base layer 1502. It should be understood that while in some embodiments the entirety of a traced element is adjacent to a base layer, in other embodiments only some portions of a traced element may be joined to a base layer. Furthermore, in some other embodiments, a base layer may be subsequently removed or separated from the traced element to provide the completed upper component. Thus, in some cases, a base layer may be a temporary receiving layer for the traced element, and may not be ultimately incorporated into an article of footwear.

Figure 16:
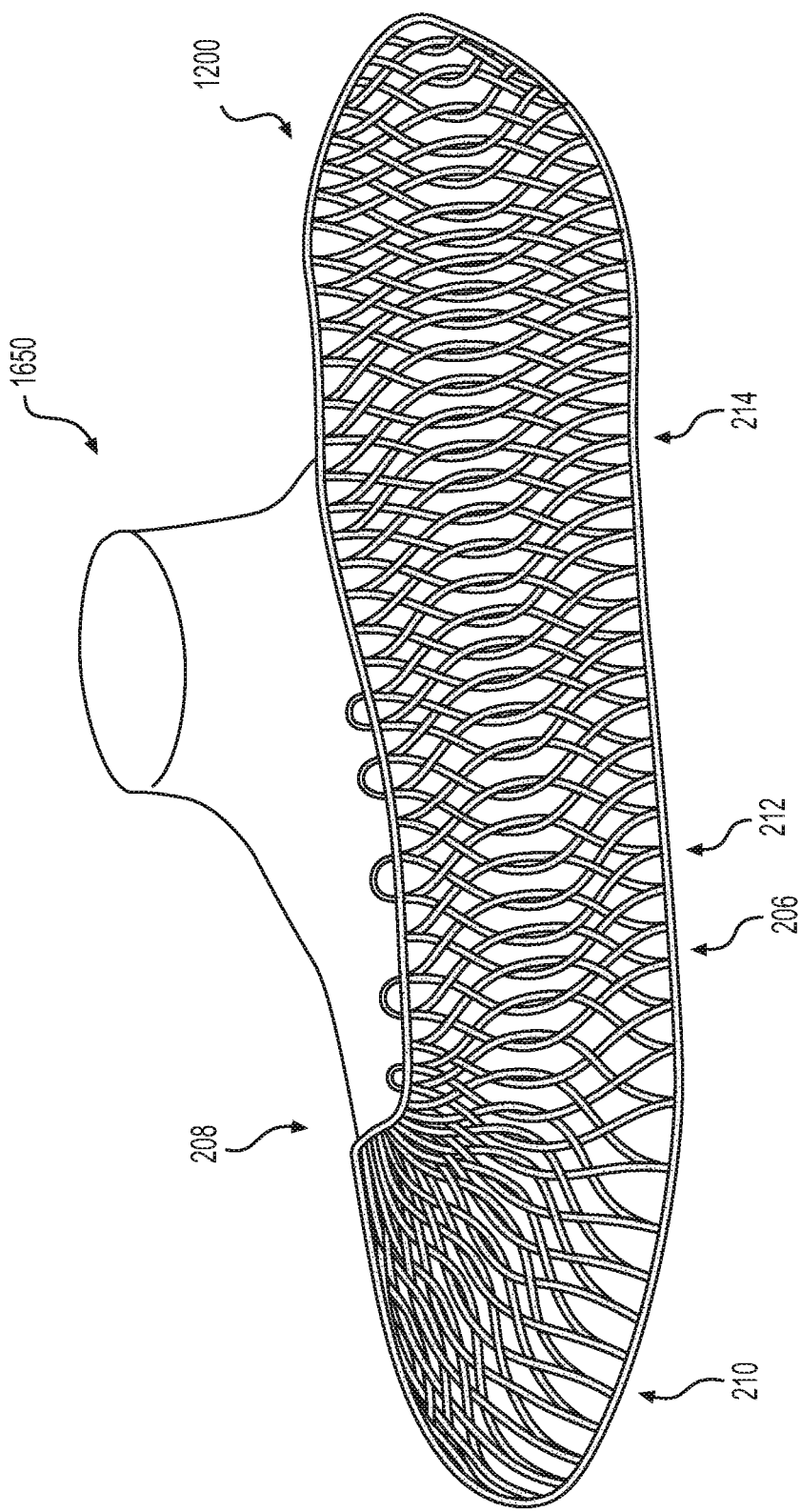
FIG. 16 is an isometric view of an embodiment of an upper component comprising a traced element being assembled on a last.

In FIG. 16, first upper component 1200 is shown in the process of being assembled from the generally flat configuration of FIG. 12 to the three-dimensional configuration of an upper (see FIG. 17) for an article of footwear. As shown in FIG. 16, first upper component 1200 includes the traced element with a first polymer layer, a strand layer, and a second polymer layer. During assembly in some embodiments, first upper component 1200 may be wrapped around a foot shaped component or a last 1650 to define a three-dimensional shape. In some embodiments, first upper component 1200 can wrap around last 1650 from either medial side 208 or lateral side 206. For example, in some embodiments, first upper component 1200 can wrap from lateral side 206, across a forefoot region 210, over to medial side 208 along a midfoot region 212, across a heel region 214, and back to lateral side 206. However, it will be appreciated that first upper component 1200 could be configured to wrap around last 1650 differently. As one example, first upper component 1200 could wrap from medial side 208, across forefoot region 210, across lateral side 206 and heel region 214, and back to medial side 208. Other configurations can also fall within the scope of the present disclosure. In addition, in some embodiments, an upper component could be formed with various structural features or shapes to facilitate the wrapping process. Furthermore, in embodiments that use a last, the traced element can be formed such that the polymer-trace paths are arranged in a specific orientation relative to particular regions or portions of a user's foot. In some embodiments, the traced element upper component can then be oriented on the last in a specific manner corresponding to the desired positioning of the various polymer segments.

Figure 17:
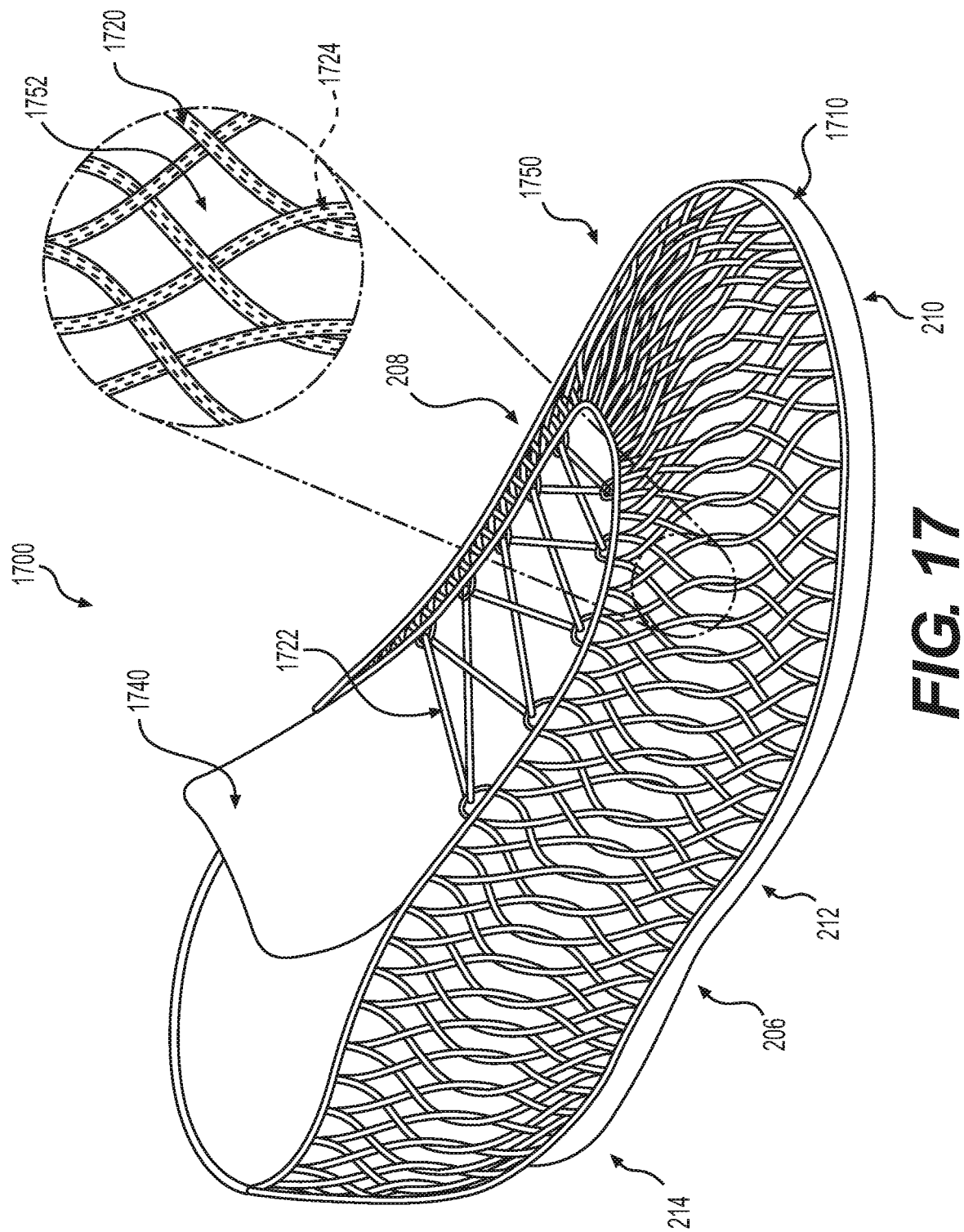
FIG. 17 is an isometric view of an embodiment of an article of footwear with an upper comprising a traced element.

Thus, in different embodiments, by providing different portions of an upper with a multilayered structure as well as a plurality of apertures, the physical properties of an upper—such as stretchability, resilience, and strength, the fit, comfort, and/or support—may be varied as desired. In FIG. 17, an article of footwear 1700 is depicted with an upper 1750, where upper 1750 is formed from first upper component 1200 of FIG. 16.

In different embodiments, once assembled as an upper, the traced element can extend over at least 50 percent of a horizontal extent of the upper. In other words, as shown in FIG. 17, the traced element can extend and encompass at least 50 percent of the extent of an upper in a lengthwise direction from forefoot region 210 to heel region 214 (i.e., from a foremost portion of the upper to a rearmost portion of the upper). In other embodiments, as shown in FIG. 17, the traced element can extend over at least 50 percent of a vertical extent of the upper, such that the traced element can extend and encompass at least 50 percent of the extent of an upper in a widthwise direction from lateral side 206 to medial side 208 (i.e., from a topmost portion of the upper to a bottommost portion of the upper). A schematic magnified view of a portion of upper 1750 includes a depiction of polymer casing 1720, where portions of polymer casing 1720 encase strand layer 1724. It can be seen that upper 1750 includes a plurality of apertures 1752.

For purposes of context, upper 1750 will now be discussed generally. Upper 1750 can define a void within article of footwear 1700 for receiving and securing a foot relative to a sole structure 1710. The void can be shaped to accommodate the foot and extends along a lateral side of the foot, along a medial side of the foot, over the foot and toes, around the heel, and under the foot.

A tongue 1740 can be included forward of a collar and can extend longitudinally toward forefoot region 210 and between lateral side 206 and medial side 208. In some embodiments, closure elements can also be included that is used to selectively secure upper 1750 to the wearer's foot. A closure element can be of any suitable type, such as a lace 1722 as shown in the illustrated embodiments. In some embodiments, lace 1722 may engage with lace aperture holes as described in FIGS. 12 and 13. In other embodiments, the closure element(s) may also include one or more buckles, straps, or other suitable implements for securing upper 1750 to a wearer's foot.

In further configurations, upper 1750 may include additional elements. Those having ordinary skill in the art will appreciate that upper 1750 can include still further elements without departing from the scope of the present disclosure.

Many conventional footwear uppers are formed from multiple material elements (e.g., polymer foam, polymer sheets, leather, synthetic leather) that are joined together through stitching or bonding, for example. However, in various embodiments discussed herein, upper 1750 can be at least partially formed from a traced element as described above. The traced element can at least partially extend through forefoot region 210, midfoot region 212, and/or heel region 214. The traced element can also extend along lateral side 206 and/or medial side 208. In addition, the traced element can at least partially define an exterior surface and/or an opposite interior surface of upper 1750. The interior surface can define at least a portion of the void within upper 1750, and the exterior surface faces in an opposite direction from the interior surface.

Furthermore, upper 1750 can be joined to sole structure 1710. Whereas sole structure 1710 is located under and supports a foot of a wearer, upper 1750 provides a comfortable and secure covering for the foot. As such, the foot may be located within the void in upper 1750 to effectively secure the foot within article of footwear 1700 or otherwise unite the foot and article of footwear 1700. Moreover, sole structure 1710 is secured to a lower area of upper 1750 and extends between the foot and the ground to attenuate ground reaction forces (i.e., cushion the foot), provide traction, enhance stability, and influence the motions of the foot, for example.

In some embodiments, sole structure 1710 can generally include a midsole and/or an outsole. A midsole can be secured to a lower surface of upper 1750 and may be formed from a compressible polymer foam element (e.g., a polyurethane or ethylvinylacetate foam) that attenuates ground reaction forces (i.e., provides cushioning) when compressed between the foot and the ground during walking, running, or other ambulatory activities. In additional embodiments, midsoles may incorporate plates, moderators, fluid-filled chambers, lasting elements, or motion control members that further attenuate forces, enhance stability, or influence the motions of the foot. The midsole can also be primarily formed from a fluid-filled chamber. An outsole can be secured to a lower surface of the midsole in some embodiments. The outsole can also be formed from a wear-resistant rubber material that is textured to impart traction.

Although FIG. 17 provides an example of a sole structure 1710 that may be used in connection with upper 1750, a variety of other conventional or nonconventional configurations for sole structure 1710 may also be used. Accordingly, in other embodiments, the features of sole structure 1710 or any sole structure used with upper 1750 may vary.

Figure 18:
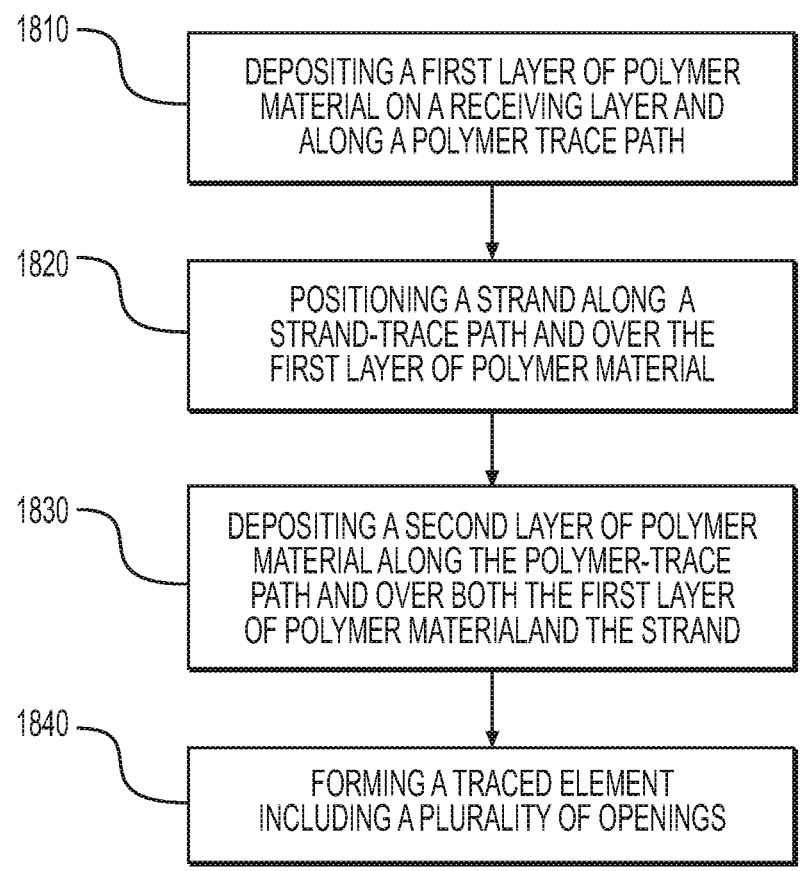
FIG. 18 is a flow diagram of a method of manufacturing a traced element.

For purposes of clarity, an embodiment of the method of manufacturing the upper components as described herein is outlined in the flow diagram of FIG. 18. Referring to FIG. 18, in a first step 1810, a first layer of polymer material is deposited on a receiving layer or platform, and along a polymer-trace path. In a second step 1820, a textile strand or strand layer is positioned along a strand-trace path and over the first layer of polymer material deposited during first step 1810. In a third step 1830, a second layer of polymer material is deposited along the same polymer-trace path and thus over both the first layer of polymer material and the strand. A fourth step 1840 involves the formation of a traced element such as an upper, where the traced element includes the first layer of polymer material, the strand, and the second layer of polymer material, and where the first layer of polymer material, the strand, and the second layer of polymer material surround a plurality of openings or apertures.

In other embodiments, the method depicted in FIG. 18 can also include additional steps. For example, in some embodiments, at least a portion of the strand-trace path is linear, and positioned to extend along a corresponding linear portion of the polymer-trace path. In some embodiments where there are linear segments, the linear polymer-trace path and the linear strand-trace path may be arranged to intersect at an angle in a plurality of positions. Furthermore, in some embodiments, the linear polymer-trace path is deposited in such a manner so as to comprise a plurality of curvilinear portions. In some embodiments, the polymer material of either or both of the first layer and the second layer can be deposited using an FDM printing method.

In another embodiment, the method can further comprise the step of bonding the first layer of polymer material to the second layer of polymer material such that they are each adjacent to the strand. In some embodiments, the method further comprises the step of selecting the strand to have an average width that is at least 5 percent of an average width of the first layer of polymer material. In one embodiment, during printing and/or after completion of the manufacture of the upper component, the strand can be unattached to the first layer of polymer material and/or the second layer of polymer material.

In other embodiments, the method further comprises the step of removing the first layer of polymer material, the strand, and the second layer of polymer material from the receiving layer to form a traced element. In another embodiment, the method may also comprise the step of forming the upper from the first layer of polymer material, the strand, the second layer of polymer material, and at least a portion of the receiving layer.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

We claim:

1. An upper for an article of footwear comprising a traced element, the traced element comprising:
    a first polymer layer comprising:
        a peripheral segment defining an outer periphery of the traced element;
        a first segment extending between a first pair of points on the outer periphery, the first segment disposed along a first trace path; and
        a second segment spaced apart from the first segment and extending between a second pair of points on the outer periphery of the upper, the second pair of points being a different pair of points from the first pair of points, the second segment disposed along a second trace path; and
    a second polymer layer comprising:
        a third segment extending between the first pair of points on the outer periphery and disposed along a third trace path that is aligned with and at least partially overlaps the first trace path; and
        a fourth segment extending between the second pair of points on the outer periphery and disposed along a fourth trace path that is aligned with and at least partially overlaps the second trace path.

2. The upper of claim 1, the traced element further comprising:
    a fifth segment of the first polymer layer extending between a third pair of points on the outer periphery; and
    a sixth segment of the first polymer layer extending between a fourth pair of points on the outer periphery, the fourth pair of points being a different pair of points from the third pair of points.

3. The upper of claim 2, the traced element further comprising a plurality of openings, wherein each opening of the plurality of openings is bounded by the peripheral segment and one or more of the first segment, the second segment, the fifth segment, and the sixth segment.

4. The upper of claim 2, further comprising a strand segment of a first strand layer disposed between the first segment of the first polymer layer and the third segment of the second polymer layer.

5. The upper of claim 2, wherein the upper further comprises a base layer and the traced element is positioned on and secured to at least a portion of an outer surface of the base layer.

6. The upper of claim 2, wherein the entirety of an upper surface of the first segment is covered by the third segment, and the entirety of an upper surface of the second segment is covered by the fourth segment.

7. The upper claim 1, wherein the first trace path and the third trace path are substantially linear.

8. The upper of claim 1, the traced element further comprising a plurality of openings bounded at least in part by the peripheral segment.

9. The upper of claim 1, wherein the third segment of the second polymer layer is polymer-bonded to the first segment of the first polymer layer, and the fourth segment of the second polymer layer is polymer-bonded to the second segment of the first polymer layer.

10. The upper of claim 1, wherein the traced element extends over at least 50 percent of a horizontal extent of the upper, and wherein the traced element extends over at least 50 percent of a vertical extent of the upper.

11. The upper of claim 1, wherein the first segment is parallel to the third segment.

12. An upper for an article of footwear comprising a traced element, the traced element comprising:
    a first polymer layer comprising:
        a peripheral segment defining an outer periphery of the traced element;
        a first segment extending between a first pair of points on the outer periphery, the first segment disposed along a first trace path; and
        a second segment spaced apart from the first segment and extending between a second pair of points on the outer periphery of the upper, the second pair of points being a different pair of points from the first pair of points, the second segment disposed along a second trace path; and
    a thermoplastic-coated strand disposed on the first segment and the second segment of the first polymer layer.

13. The upper of claim 12, further comprising:
    a second polymer layer comprising:
        a third segment extending between the first pair of points on the outer periphery and disposed along a third trace path that is aligned with and at least partially overlaps the first trace path; and a fourth segment extending between the second pair of points on the outer periphery and disposed along a fourth trace path that is aligned with and at least partially overlaps the second trace path.

* * * * *